Dec. 24, 1963  W. H. HOGAN  3,115,016
REFRIGERATION METHOD AND APPARATUS
Filed July 30, 1962  16 Sheets-Sheet 1

*INVENTOR.*
Walter H. Hogan
BY
Attorney

Dec. 24, 1963 W. H. HOGAN 3,115,016
REFRIGERATION METHOD AND APPARATUS
Filed July 30, 1962 16 Sheets-Sheet 2

INVENTOR.
Walter H. Hogan
BY
Attorney

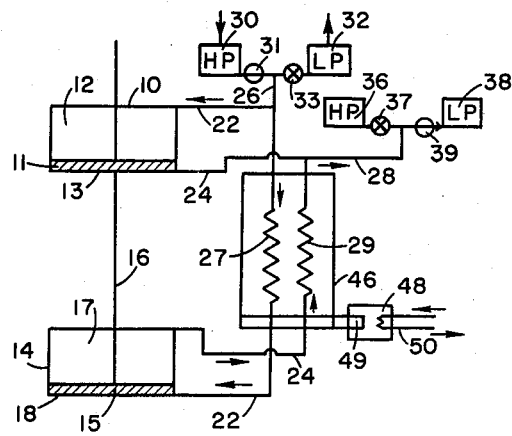
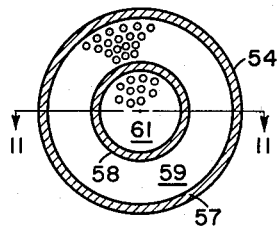
Fig. 9
Fig. 11
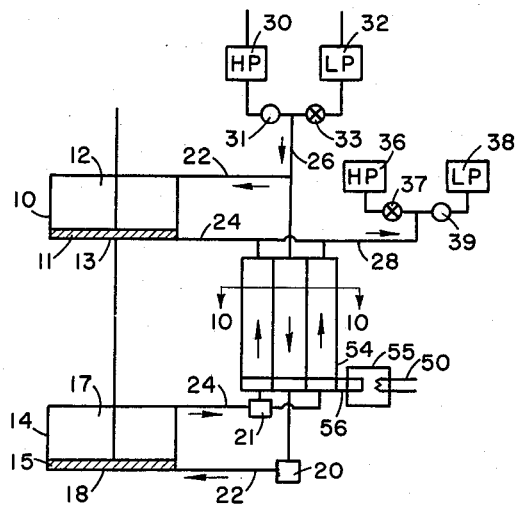
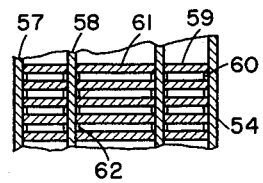
Fig. 10
Fig. 12
INVENTOR.
Walter H. Hogan Dec. 24, 1963 W. H. HOGAN 3,115,016
REFRIGERATION METHOD AND APPARATUS
Filed July 30, 1962 16 Sheets-Sheet 5

INVENTOR.
Walter H. Hogan
BY
Attorney

Dec. 24, 1963 W. H. HOGAN 3,115,016
REFRIGERATION METHOD AND APPARATUS
Filed July 30, 1962 16 Sheets-Sheet 6

INVENTOR.
Walter H. Hogan
BY
Attorney

INVENTOR.
Walter H. Hogan

Dec. 24, 1963    W. H. HOGAN    3,115,016
REFRIGERATION METHOD AND APPARATUS
Filed July 30, 1962    16 Sheets-Sheet 11

INVENTOR.
Walter H. Hogan
BY
Attorney

Dec. 24, 1963 W. H. HOGAN 3,115,016
REFRIGERATION METHOD AND APPARATUS
Filed July 30, 1962 16 Sheets-Sheet 12

INVENTOR.
Walter H. Hogan
BY
Attorney

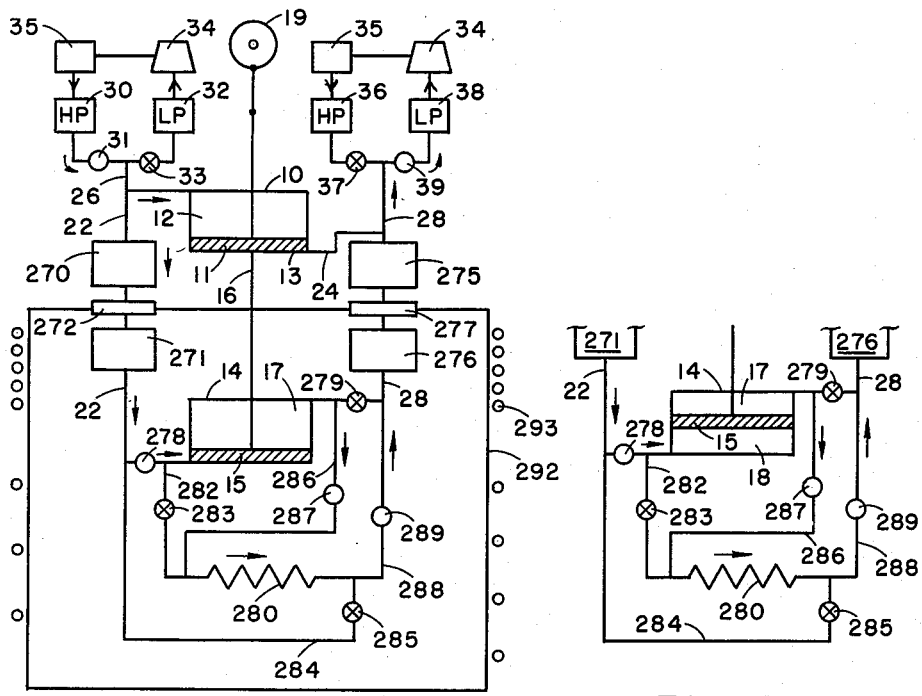
Fig. 30
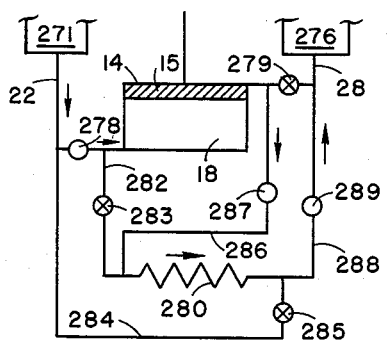
Fig. 32
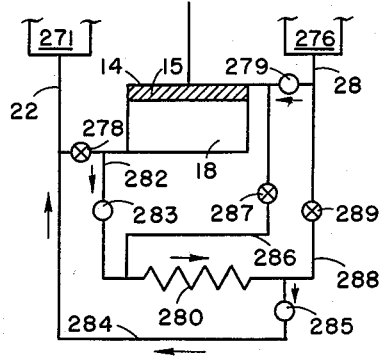
Fig. 31
Fig. 33

Dec. 24, 1963 W. H. HOGAN 3,115,016
REFRIGERATION METHOD AND APPARATUS
Filed July 30, 1962 16 Sheets-Sheet 15

INVENTOR.
Walter H. Hogan
BY
Attorney

United States Patent Office 3,115,016
Patented Dec. 24, 1963

3,115,016
REFRIGERATION METHOD AND APPARATUS
Walter H. Hogan, Wayland, Mass., assignor to Arthur D. Little, Inc., Cambridge, Mass., a corporation of Massachusetts
Filed July 30, 1962, Ser. No. 213,185
49 Claims. (Cl. 62—6)

This invention relates to refrigeration method and apparatus and more particularly to a method and apparatus for attaining low temperatures economically.

There are described and known in the prior art a number of cycles and their apparatus for achieving refrigeration. Many such cycles are based upon the use of expansion engines or turbines. Others involve complicated heat exchange systems, while still others (although somewhat more simple in design) require tightly-fitting pistons and sealing rings which must be capable of operation under extremely low temperatures.

In order to overcome the disadvantages inherent in the prior art refrigeration cycles, method and apparatus were developed for materially lessening these disadvantages. These methods and apparatus are the subject of U.S. Patents 2,906,101, 2,966,034 and 2,966,035. In these patents there are described and claimed novel refrigeration methods and apparatus, the method and apparatus of U.S. Patent 2,966,035 being directed to a so-called "no work" cycle in which refrigeration is obtained by removing more sensible heat from the system than is taken into the system by the refrigerating fluid used. Although the cycle described in U.S. Patent 2,966,035 has been found to be very successful in producing refrigeration even as low as 4.2° K., the method and apparatus of this cycle possess an inherent disadvantage in that the hot and cold ends of the apparatus are thermally connected since they are both within a single cylindrical housing. This thermal connection is responsible for loss in efficiency due to transfer of heat from the hot to the cold end. This is true even though such modifications as loose-fitting displacers, heat stations and the like are employed in connection with the basic method and apparatus. The limitation in efficiency which can be attained with the method and apparatus described in U.S. Patent 2,966,035 is due to the unavoidable heat transfer which takes place within the system. It will be appreciated that for attaining extremely low temperatures of the order of 4.2° K. (the liquefaction point of helium) this heat transfer is of particular importance. In the method and apparatus of U.S. Patent 2,9366,035 this heat transfer is greatly reduced but is still present to some extent. The problem therefore becomes one of not only reducing but of eliminating the heat leak from the hot to the cold zones. I have found that by the use of a double acting system it is possible to eliminate this heat leak and thereby to provide method and apparatus for refrigeration which is not only extremely efficient at higher temperatures but also at the very low temperatures.

It is therefore the primary object of this invention to provide a novel refrigeration method which eliminates the transfer of heat between the hot and cold zones, a factor which is a major cause of loss of efficiency in most refrigeration methods. It is another object of this invention to provide a method of the character described which is capable of producing refrigeration down to or even below 4.2° K., i.e., is capable of liquefying $He^4$ and even $He^3$. It is another object of this invention to provide such a method which is flexible in operation and versatile in its application in connection with other methods, for example maser operation or infra-red detection.

It is another primary object of this invention to provide an apparatus for refrigeration which eliminates heat transfer between the hot and cold portions of the apparatus. It is another object to provide apparatus of the character described which is efficient, flexible in arrangement, and permits use with other apparatus. It is another object to provide refrigeration apparatus which permits the incorporation of auxiliary heat exchange means to attain extremely low temperatures. Yet another object is to provide a low temperature apparatus which can be made in extremely small sizes for use as a source of refrigeration in many devices such as space vehicles, missiles, etc. Other objects of the invention will in part be obvious and in part be apparent hereinafter.

The method of this invention may be described in terms of a cycle which comprises the steps of:

(a) delivering high-pressure fluid from a high-pressure fluid source into communicating first and second spaces and compressing residual low-pressure fluid in the first space thereby to heat the residual fluid, while simultaneously dischaging high-pressure fluid from communicating third and fourth enclosed spaces into a low-pressure region, thereby cooling the fluid in the fourth space;

(b) continuing delivery of the high-pressure fluid from the high-pressure fluid source and transferring heated fluid from the first space to the second space, while simultaneously continuing discharging fluid from the fourth space thereby reducing its pressure to that of the low-pressure region and to the third space where it becomes residual fluid;

(c) throughout delivery and discharge of steps (a) and (b) extracting heat from the high-pressure fluid thereby to cool it initially and transferring heat to the low-pressure fluid thereby to heat it initially;

(d) expanding the high-pressure fluid in the second space to cool it further by discharging it into a low-pressure region, while simultaneously supplying high-pressure fluid from a high-pressure fluid source to the third and fourth spaces and compressing residual low-pressure fluid in the third space delivered thereto in step (b) thereby to heat the residual fluid;

(e) continuing transfer of low-pressure fluid from the second space to the low-pressure region and to said first space to become the low-pressure residual fluid of step (a), while simultaneously continuing delivery of the high-pressure fluid from the high-pressure fluid source and transferring heated fluid from the third space to the fourth space; and (f) throughout discharge and delivery of steps (d) and (e) transferring heat to the low-pressure fluid to heat it initially while extracting heat from the high-pressure fluid to cool it initially, thereby establishing the conditions to begin step (a).

As will be apparent in the detailed description which follows, this cycle is also of the "no work" type, i.e., the energy extracted (and hence the refrigeration produced) is in the form of thermal energy. In my copending application Serial No. 213,184 filed at the same time as this application I have disclosed the corresponding "work" cycle in which the energy delivered external of the system is mechanical energy.

The basic apparatus of this invention comprises a first warm chamber of constant volume, a second cold chamber of constant volume, mechanically connected first and second displacer means movable within the first and second chambers, respectively, and adapted to define within each chamber upper and lower subchambers of variable volumes; first passage means communicating between the upper subchamber of the first chamber and the lower subchamber of the second chamber; second passage means communicating between the lower subchamber of the first chamber and upper subchamber of the second chamber; supply reservoir means for supplying high-pressure fluid, exhaust reservoir means for receiving low-pressure fluid; and heat exchange means associated with the first and second passages and adapted to transfer heat between the high-pressure and low-pressure fluids as they are transferred within the system.

As will be apparent in the following description, modifications are possible in the passage means and in the heat transfer means. There may also be a third auxiliary chamber having a piston mechanically connected to the displacers and used to balance the pressures within the chambers, provided the hot and cold chambers are not of the same volume. It is also possible to combine with the basic apparatus auxiliary heat exchange means to increase the efficiency of the apparatus and to permit the attaining of extremely low temperatures. All of these modifications will be described in detail below.

The invention accordingly comprises the several steps and the relation of one or more of such steps with respect to each of the others, and the apparatus embodying features of construction, combination of elements and arrangements of parts which are adapted to effect such steps, all as exemplified in the following detailed disclosure. The scope of the invention will be indicated in the claims.

For a fuller understanding of the nature and objects of the invention, reference should be had to the following detailed description taken in connection with the accompanying drawings in which FIGS. 1–6 are simplified diagrammatic views of the apparatus of this invention illustrating the steps in the basic cycle;

FIG. 9 illustrates a modification of the apparatus showing the use of a countercurrent heat exchanger;

FIG. 10 illustrates another modification of the apparatus showing the use of a combination of a countercurrent heat exchanger with a regenerator;

FIG. 11 is a horizontal cross-section of a typical combination heat exchanger and regenerator such as shown in FIG. 10;

FIG. 12 is a fragmentary vertical cross-section of the heat exchanger of FIG. 11;

FIGS. 30–35 are simplified diagrammatic views of a modification of the apparatus of FIGS. 1–6 illustrating the steps of a modification in the basic cycle;

Figure 1:
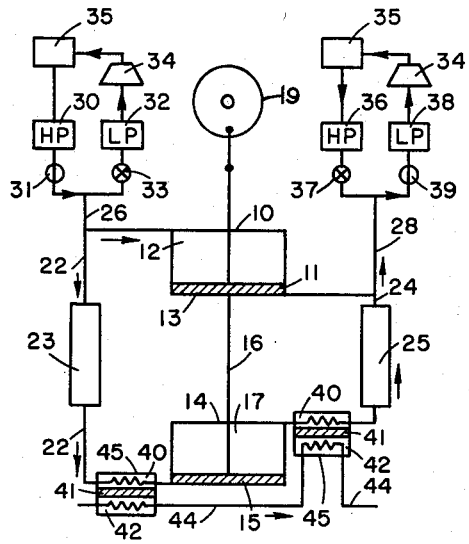

Turning now to FIG. 1, the basic apparatus may first be described with reference to that drawing before a detailed description of the cycle is given. In FIG. 1 it will be seen that there are provided a hot chamber 10 and a cold chamber 14. It will be appreciated that the terms "hot" and "cold" are used in a relative sense, the hot chamber normally being one which is at room temperature or slightly above, whereas the cold chamber is at a temperature approximating that at which refrigeration is available to an external load.

The hot chamber 10 has movable within it a displacer 11 which divides this chamber into an upper subchamber 12 and a lower subchamber 13, the volume of these subchambers being variable and defined by the position of the displacer 11 in chamber 10. In like manner, the cold chamber 14 has movable within it displacer 15 which is mechanically connected to displacer 11 by suitable means such as an essentially gas-tightly sealed connecting rod 16, thus coordinating the movements of displacers 11 and 15. Appropriate displacer movement is achieved through a driving means illustrated as drive wheel 19. Thus, in a similar manner displacer 15 defines within chamber 14 an upper subchamber 17 and a lower subchamber 18, the volumes of these subchambers being variable and defined by the position of displacer 15. Both displacers 11 and 15 are close-fitting within their respective chambers so that they form an essentially gas-tight seal with the walls of the chambers. Because the subchambers of each chamber are at substantially the same temperature the seals do not have to be absolutely gas-tight.

In the following detailed description of this invention reference will be made from time to time to displacers and pistons, and in keeping with common practice the term "piston" will be used to include a sliding body moving within a cylindrical vessel whether or not it experiences pressure differentials on its surfaces and whether or not it responds to changes in the thermodynamic characteristics of the fluids acting upon its surfaces to generate mechanical work. The term "displacer" will be reserved for a similar sliding body which experiences essentially no pressure differentials on its surfaces and which generates or delivers no external work. Thus the term "piston" includes displacers and is used in a generic sense. Where it is possible to construe the role of the sliding body as either, it will be referred to as a piston.

Further with respect to terminology, it will be noted in the detailed description of the apparatus of this invention that the subchambers within the chambers are referred to as "upper" and "lower" subchambers. This is done wholly for convenience and to relate the description to the diagrammatic representations in the drawings. It will be appreciated that the apparatus can function in any position or orientation and it is within the scope of this invention to have it do so.

Between chambers 10 and 14 there are two connecting paths: conduit 22 which joins the upper subchamber 12 of the hot chamber 10 with the lower subchamber 18 of the cold chamber 14, and conduit 24 which joins the lower subchamber 13 of the hot chamber 10 with the upper subchamber 17 of the cold chamber 14. In describing these subchambers in terms of a refrigeration method, subchambers 12 and 18 are referred to as the first and second enclosed spaces while subchambers 13 and 17 are referred to as the third and fourth enclosed spaces, respectively.

Located in and associated with the connecting paths, e.g., conduits 22 and 24 are heat exchange means which in the apparatus of FIGS. 1–6 are shown as regenerators 23 and 25. Leading into conduit 22 is a branch conduit 26 and leading into conduit 24 is a branch conduit 28. High-pressure fluid is introduced into subchambers 12 and 18 through branch conduit 26 and controlled by valve 31, while the fluid from these subchambers is discharged into low-pressure reservoir 32 through branch conduit 26, the flow being controlled by valve 33. In like manner high-pressure fluid is introduced into subchambers 13 and 17 through branch conduit 28, and its flow is controlled by valve 37; while fluid from these subchambers is discharged into the low-pressure reservoir 38 through branch conduit 28, and its flow is controlled by valve 39.

The temperature of the fluids flowing back and forth in those portions of conduits 22 and 28 which join the lower ends of the regenerators 23 and 25 with subchambers 18 and 17, respectively, will fluctuate relatively widely. For this reason some stabilization in fluid temperature in these regions is dictated by the necessity for high regenerator efficiencies and/or for a reasonably constant level of refrigeration output. Two alternative arrangements for attaining such stabilization are illustrated in FIGS. 1 and 2.

The means for fluid temperature stabilization shown in FIG. 1 includes means for delivering refrigeration to an outside or external load. In this apparatus a heat exchanger 45 is provided which is formed in three sections, section 40 being adapted to effect heat exchange between the fluids flowing in conduit 22 (or 28) with a heat sink 41, formed for example of a mass of lead, or other material which has a high heat capacity in the temperature range represented by the temperature of the cold fluid. The third section 42 of the heat exchanger is adapted to effect heat exchange between the heat sink 41 and an external load, such as a suitable heat transfer fluid circulated in conduit 44. It is, of course, also possible to bring an external load (e.g., an infrared detector) in direct thermal contact with the heat sink 41, thus eliminating the heat transfer fluid and conduit 44. By the use of a heat sink of sufficient magnitude it is possible for it to experience fluctuating temperature on the side adjacent section 40 and a substantially constant temperature on the side adjacent section 42.

Figure 2:
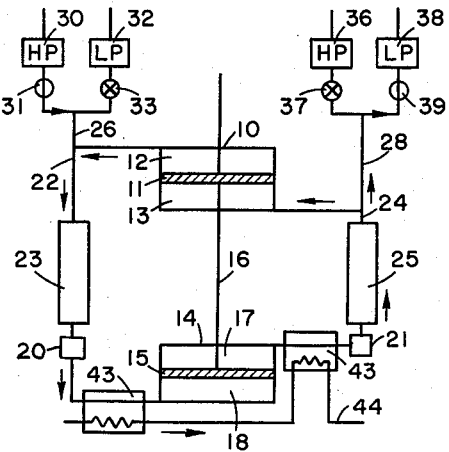

FIG. 2 illustrates an alternative arrangement which provides heat stations 20 and 21 (such as those illustrated in FIGS. 13 and 14 of U.S. Patent 2,966,035) to stabilize the operation of regenerators 23 and 25, and a separate means for supplying refrigeration from the system through suitable external loads shown as heat exchangers 43 located at the outlet of subchambers 17 and 18. Refrigeration is transferred externally by means of a suitable heat transfer fluid circulated through heat exchanger 43 by means of a conduit 44. In this case, fluctuations in the refrigeration delivered will be greater than in the apparatus of FIG. 1. In the remaining FIGS. 3–6 these alternatives (i.e., heat exchanger 45 or heat exchanger 43 with heat station 20) are merely designated diagrammatically by a box 47 to simplify the drawings.

Figure 7:
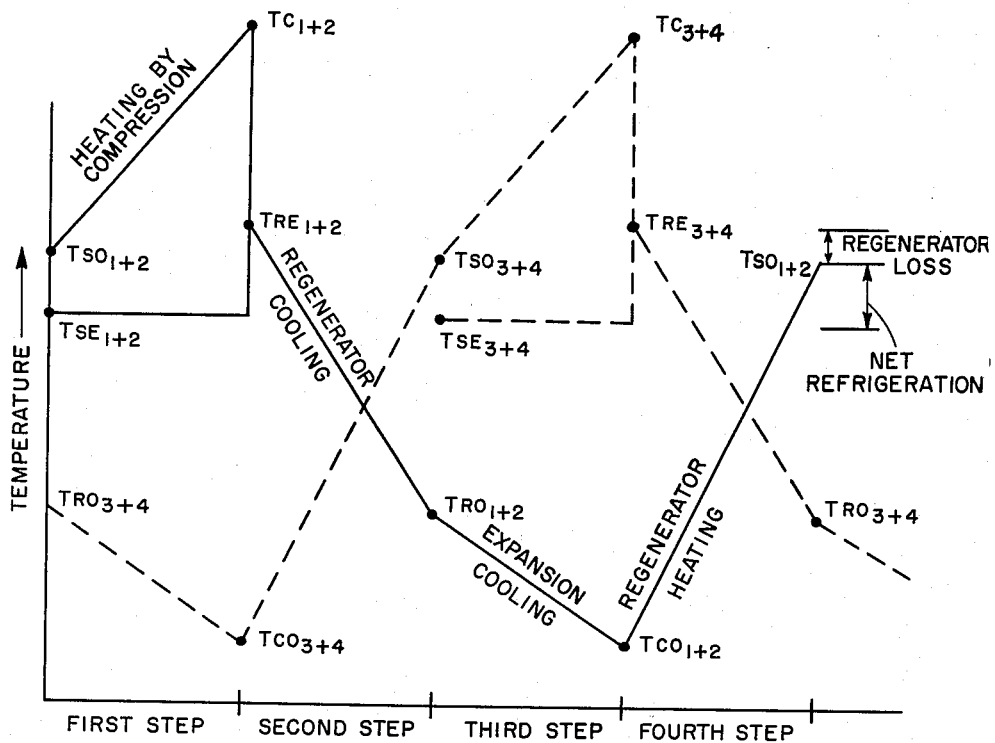
FIG. 7 is a diagrammatic representation of the temperature conditions existing in the first and third enclosed spaces and simultaneously in the second and fourth enclosed spaces.

The refrigeration method of this invention may be now described in terms of a cycle and with reference to FIGS. 1–6. In the figures, valves which are open are indicated by an open circle whereas those which are closed are indicated by an "x" within the circle. It will be appreciated that compressors 34 and coolers 35 which are shown in FIG. 1 are also present in the apparatus in all of the FIGS. 1–6. Since they are the same they are not repeated in the drawings. In describing the cycle of this invention reference should also be had to FIG. 7 which is a diagrammatic representation of the temperature conditions existing in the subchambers. In FIG. 7 the curves are identified in terms of the ordinal numbers used in claiming the basic cycle by the use of subscripts identifying the temperature points. The solid line plots the temperature conditions in the first and second subchambers or enclosed spaces (i.e., subchambers 12 and 18, respectively); while the dotted line plots the temperature conditions in the third and fourth subchambers or enclosed spaces (i.e., subchambers 13 and 17, respectively). It is to be understood that FIG. 7 is diagrammatic and no attempt has been made to indicate actual temperature levels on a linear or other scale.

Figure 8:
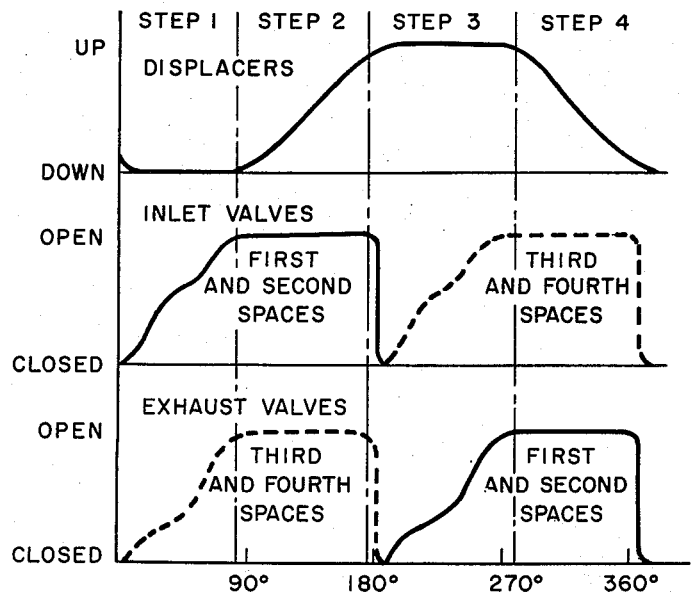
FIG. 8 illustrates a typical operational sequence for the cycle of the apparatus of FIGS. 1–6.

Inasmuch as a description of a method such as this must be somewhat stylized when shown in diagrammatic drawings (FIGS. 1–6) reference should also be had to FIG. 8 which plots the movement of the displacers and the corresponding sequential operations of the four principal valves (31, 33, 37 and 39) which control the flow of high-pressure and low-pressure fluids on both sides of the cycle.

Since the cycle must begin at some point it will be described as beginning with the conditions prevailing in FIG. 1 just as the high pressure valve 31 and low-pressure valve 39 are opened. (Valves 33 and 37 are closed.) Now at this instant warm subchamber 12 contains residual low-pressure fluid while cold subchamber 17 contains cold high-pressure fluid. In the following description the subscripts used in connection with temperature T designate the point at which the temperature is determined, that is, SE refers to the temperature of the fluid at the subchamber entry, SO to the fluid temperature at the subchamber outlet, C to the temperature at the compressor outlet, RE to the temperature at the regenerator entry, RO to the temperature at the regenerator outlet, and CO to the fluid temperature at the cold subchamber outlet. The numeral subscripts appended to these letter subscripts denote the various chambers involved. Thus, for example, $T_{RE_{1+2}}$ indicates the temperature of the fluid entering the first and second regenerators while $T_{CO_{3+4}}$ indicate the temperature of the fluid leaving the cold subchambers 3 and 4. When valve 31 is opened high-pressure fluid at a temperature $T_{SE_{1+2}}$ (FIG. 7) is delivered from the high-pressure fluid source 30 to the two communicating subchambers 12 and 18, the communication being, of course, through the regenerator 23. With the delivery of high-pressure fluid into subchamber 12 the residual low-pressure fluid contained therein initially at $T_{SO_{1+2}}$ is compressed and heated. Now it will be seen that the fluid in subchamber 12 is at a temperature above that which the high-pressure fluid entered the system through conduit 26, namely at $T_{C_{1+2}}$.

Simultaneously with the delivery of high-pressure fluid into subchambers 12 and 18, fluid is being discharged to the low-pressure reservoir 38. This means that the high-pressure cold fluid present in subchamber 17, which had been initially cooled by passage through regenerator 25 (as will be explained below) is further cooled by expansion. Thus as shown in FIG. 7, the temperature of the high-pressure fluid in subchamber 17 drops from $T_{RO_{3+4}}$ to $T_{CO_{3+4}}$.

With the movements of the fluids within the system in step one it will be appreciated that forces acting on the displacers 11 and 15 maintain them in essentially the positions indicated in FIG. 1. During this step the volume of subchamber 12 is essentially equal to that of chamber 10 and that of subchamber 13 is essentially zero; while the volume of subchamber 17 is essentially that of chamber 14 and the volume of subchamber 18 is essentially zero.

Figure 3:
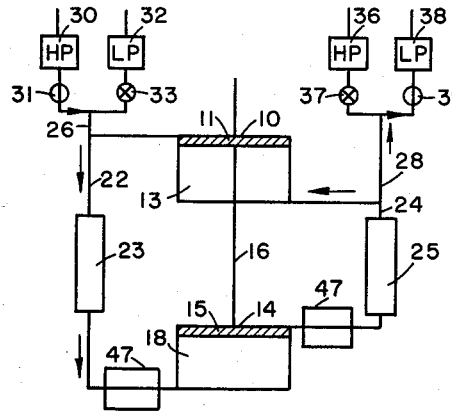

During the second step displacers 11 and 15 are forced to their uppermost position and are maintained in this position as illustrated in FIGS. 2 and 3. In the second step delivery of the high-pressure fluid to subchambers 12 and 18 is continued. With the movement of displacers upwardly by virtue of the high-pressure fluid entering subchamber 18 and fluid exhausting from subchamber 17 it is necessary to continue this delivery of high-pressure fluid to maintain the high-pressure side of the system at essentially constant pressure since the volume of the fluid entering subchamber 18 is decreased by virtue of the fact that it is initially cooled in its passage through regenerator 23. Thus the cold fluid in subchamber 18 at the end of this step (FIG. 3) remains at high pressure.

With the continued addition of high-pressure fluid at temperature $T_{SE_{1+2}}$ the temperature of the high-pressure fluid delivered to the regenerator 23 will be intermediate between the temperatures of the entering and compressed fluids by virtue of the mixing of fluids at $T_{C_{1+2}}$ and $T_{SE_{1+2}}$. This temperature is identified as $T_{RE_{1+2}}$ in FIG. 7. Further, during this second step the high-pressure fluid entering subchamber 18 is initially cooled to the point designated $T_{RO_{1+2}}$ from $T_{RE_{1+2}}$, this initial cooling being accomplished by passage through regenerator 23.

On the now low-pressure side of the system the expanded cold, low-pressure fluid in subchamber 17 returns through regenerator 25 giving up heat and cooling the regenerator. Thus this low-pressure fluid is warmed from $T_{CO_{3+4}}$ to $T_{SO_{3+4}}$ as shown in FIG. 7.

In this step a portion of the now warm low-pressure fluid enters subchamber 13 (FIG. 2) to fill this expanding subchamber with warm low-pressure fluid. It will be seen that the temperature $T_{SO_{3+4}}$, which represents the temperature at which the low-pressure fluid leaves the regenerator and the system is a little less than the temperature at which the high-pressure fluid entered this regenerator at point $T_{RE_{3+4}}$ as will be explained later.

At the end of this second step (FIG. 3) the volumes of subchamber 18 and of subchamber 13 are essentially equivalent to the volumes of chambers 14 and 10, respectively, while the volumes of subchambers 12 and 17 are essentially zero.

Figure 4:
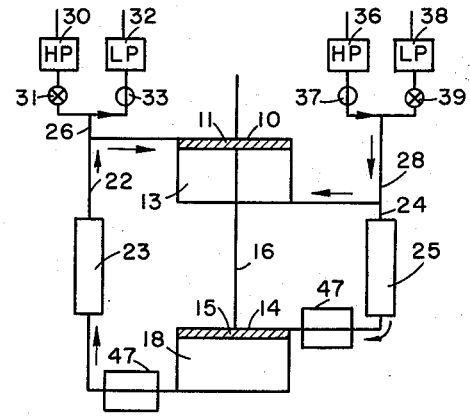
Figure 5:
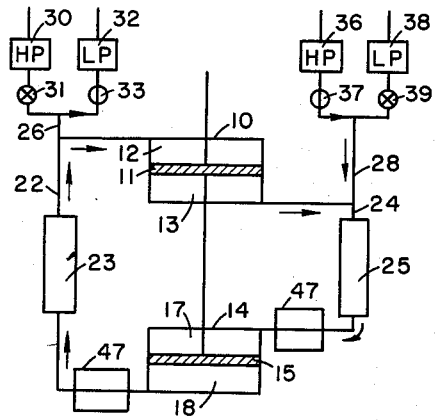
Figure 6:
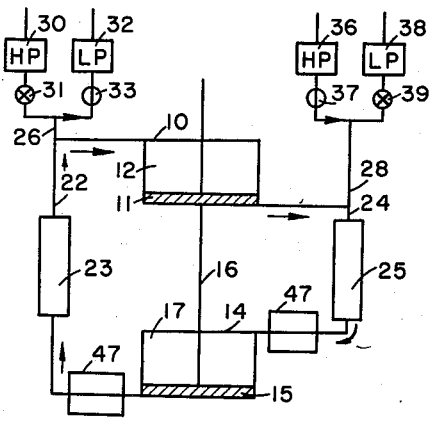

In the third step, illustrated in FIGS. 4 and 5, high-pressure valve 31 is closed and low-pressure valve 33 is opened. Simultaneously high-pressure valve 37 is opened and low-pressure valve 39 is closed, thus in essence bringing about the reversal of the cycle. The high-pressure fluid in subchamber 18, as it discharges into the low-pressure reservoir 32, expands and further cools as designated in FIG. 7. There it will be seen that the temperature of this fluid drops from $T_{RO_{1+2}}$ to $T_{CO_{1+2}}$, the lowest point in the refrigeration cycle. Thus the fluid in subchamber 18 has duplicated the performance of the fluid in subchamber 17 in the first step. With high-pressure valve 37 open high-pressure fluid is introduced into subchamber 13 wherein the residual fluid contained therein initially at $T_{SO_{3+4}}$ is compressed and heated to raise the fluid temperature to $T_{C_{3+4}}$.

Thus in similar fashion the high-pressure fluid in subchamber 13 passes through the same temperature cycle as the fluid in subchamber 12 in the first step. As is evident from the build-up of pressure in subchamber 17 and decrease of pressure in subchamber 18 the displacers move downwardly during this step and remain in their lowermost position in the fourth step.

During the fourth step, the expanding fluid leaving subchamber 18 returns through regenerator 23 to cool it and itself be warmed to the temperature $T_{SO_{1+2}}$ which is a little less than the temperature at which it entered regenerator 23, namely $T_{RE_{1+2}}$, the difference being due to regenerator losses. A portion of this low-pressure fluid fills subchamber 12 to become the residual fluid therein for repetition of the first step described above.

It will be appreciated that inasmuch as the fluid entered the system at a temperature designated as $T_{SE_{1+2}}$ (a temperator lower than that at which it left the system) there is thermal energy taken out of the system in the form of sensible heat. The net refrigeration achieved then is essentially equivalent to the difference between $T_{SO_{1+2}}$ and $T_{SE_{1+2}}$. In this same manner refrigeration was achieved in step 2 when the low-pressure fluid was exhausted at a temperature designated $T_{SO_{3+4}}$.

Simultaneously with the delivery of refrigeration from the first and second subchambers 12 and 18, the delivery of high-pressure fluid is continued to subchamber 17 initially cooling the fluid to the point designated $T_{RO_{3+1}}$. As in the case of high-pressure fluid entering subchamber 18 is in the second step, this continuing of high-pressure fluid supply means that essentially constant pressure is maintained within the system during step 4 (FIG. 6) thus forcing the displacers to remain at their lowermost position and build up a supply of high-pressure cold fluid in subchamber 17 to reach the point in the cycle where the first step begins again.

With the continuation of high-pressure fluid supply the heated fluid of subchamber 13 mixes with the incoming high-pressure fluid to give the high-pressure fluid entering regenerator 25 an intermediate temperature designated at $T_{RE_{3+4}}$.

With the above-described conditions obtaining at the close of step 4 the cycle is begun again with step 1 by closing valves 33 and 37 and opening valves 31 and 39.

Each side of the system is preferably a closed system which requires recompressing the fluid in the low-pressure reservoirs 32 and 38 in a suitable compressor 34 and then cooling in a cooler 35 before storing in the high-pressure supply means 30 and 36. In FIG. 7 the high-pressure fluid is shown being delivered at temperature $T_{SE}$ which is essentially that temperature of the fluid as it is delivered from the high-pressure supply means.

The refrigeration fluids used on each side of the cycle may be the same fluid and may be drawn from a common high-pressure fluid source and exhausted into a common low-pressure reservoir. The fluids on both sides of the cycle may also, of course, be different, in which case separate high-pressure fluid supply means and low-pressure fluid exhaust means must be used for each side as shown in FIG. 1.

Temperature stabilization during fluid flow is attained through the use of heat exchanger 45 (FIG. 1) or the combination of heat stations 20 and 21 and heat exchangers 43 (FIG. 2). The manner in which refrigeration is supplied to an external load has been described above in connection with the discussion of FIGS. 1 and 2.

In FIGS. 1–6 the heat exchange between the high-pressure and low-pressure fluids was achieved through the use of regenerators 23 and 25. Other methods and apparatus for this heat exchange may be used and two modifications are illustrated in FIGS. 9 and 10, wherein like elements have been given like reference numerals.

In FIG. 9 the heat exchange is accomplished through the use of a countercurrent heat exchanger 46. Conduits 22 and 24 are led into heat exchanger 46 and are joined to and integral with any suitable heat exchange paths 27 and 29, respectively, in heat exchanger 46. Although these paths 27 and 29 are illustrated in the conventional way, it will be appreciated that one may be a coil (for example in a helical configuration) while the other may be defined as the path around the coil. In the arrangement shown in FIG. 9, an external load 48 is represented as comprising a suitable thermal conduit 49 bonded to the cold end of the heat exchanger and a conduit 50 for circulating a suitable heat transfer fluid.

In FIG. 10 there is shown an arrangement whereby the heat exchange is accomplished in what may be termed a combination countercurrent heat exchanger and regenerator designated as numeral 54. FIGS. 11 and 12 are horizontal and vertical cross-sections of this heat exchanger, respectively. Such a heat exchanger is typically in the form of two concentric shells 57 and 58 defining between them an annular space occupied by flat annular foraminous members 59 held in spaced relationship by suitable insulating spacers 60. The inner shell 58 also contains spaced foraminous discs 61 held apart by suitable spacers 62. In this type of heat exchanger one fluid would of course flow in one direction through the annular spacing while the other fluid would flow in the opposite direction in the central passage. As in the case of the heat exchanger in FIG. 9 the external load 55 is taken off at the bottom of heat exchanger 54 through a suitable thermal conduit 56.

The refrigeration cycle carried out in the apparatus in FIG. 9 is essentially the same as the basic cycle described above. The difference is that the heat exchange is accomplished in a countercurrent heat exchanger between the cold, low-pressure fluid leaving either subchambers 17 and 18 and the warm, high-pressure fluid entering either from subchamber 12 or 13. Refrigeration is extracted from the system through the heat exchanger 43 by means of a suitable heat exchange fluid circulated in line 50 which is in thermal contact with a thermal conduit 49 bonded to the bottom portion of the heat exchanger 46.

In the cycle as carried out in FIG. 9 it will of course be necessary to balance the fluid flow. Although this is possible, there may be certain disadvantages introduced in this requirement. Such disadvantages can be overcome by the combination of countercurrent heat exchanger and regenerator as illustrated in FIG. 10. As shown in FIG. 10 the cold, low-pressure fluid is passed through the central portion of a heat exchanger which also possesses the characteristics of a regenerator in that it is formed from foraminous disks spaced apart. The warm, high-pressure fluid in turn is circulated through the annular portion of the heat exchanger which is made up of foraminous annular rings also held in spaced relation. Thus the heat transfer is accomplished through countercurrent, out-of-contact heat exchange (recuperation) as well as by regeneration. As in the case of FIG. 9, refrigeration is delivered at the colder or bottom end of the heat exchanger 54 through a heat exchanger 55 which is in thermal contact with the thermal conduit 56.

It should be pointed out that the apparatus of FIGS. 9 and 10 make possible the construction of a very efficient refrigerator in extremely small sizes.

In FIGS. 13-20 there is shown a modification of the apparatus of this invention. FIGS. 13-20 represent diagrammatically the various steps in the cycle with relation to this apparatus modification. The modification in the apparatus of FIGS. 13-20 lies in the use of pistons in the hot and cold chambers of different areas and the use of an auxiliary chamber and piston to achieve the balance of forces required. Thus in the apparatus shown in FIGS. 13-20 there are provided a warm chamber 62, an auxiliary warm chamber 63 and a cold chamber 64. Moving within these chambers are pistons 65, 66 and 67, the three pistons being mechanically joined by an essentially gas-tightly sealed connecting rod 16. In order to achieve the balance of forces the area of piston 65 must be larger than that of piston 67 but smaller than the sum of the areas of pistons 66 and 67. The magnitude of the differences in surface area must be sufficient to overcome the inertia and friction forces encountered.

Warm chamber 62 is divided into an upper subchamber 68 and a lower subchamber 69; while cold chamber 64 is divided into upper subchamber 70 and lower subchamber 71. As in the case of the apparatus of FIGS. 1-6 the pistons form a substantially gas-tight seal with the cylinder walls and thus in their movement upward and downward they vary the volume of the subchambers: in the case of subchambers 64, 71 and 72 from essentially zero to the total volume of the chambers in which they are located, while in the case of subchamber 68 from the volume of chamber 63 to that of chamber 62.

Figures 13, 14:
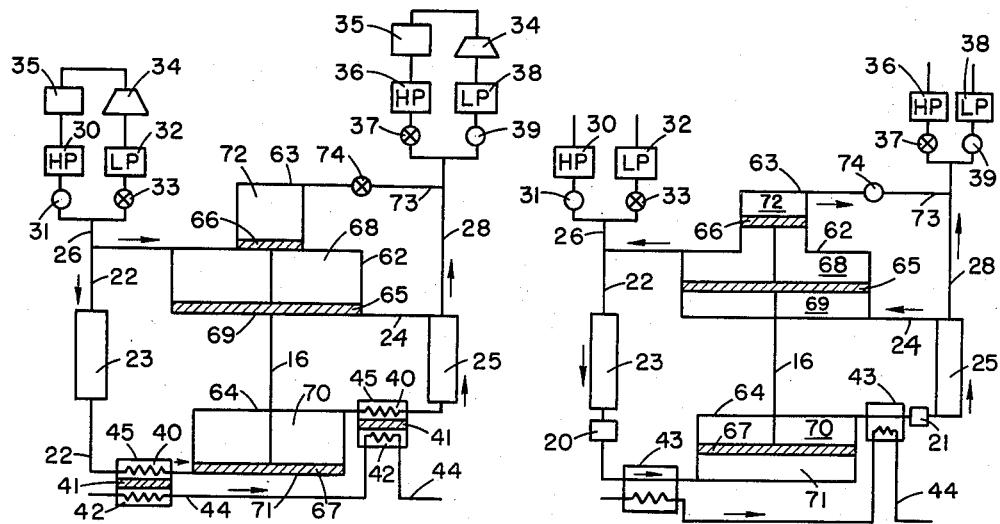
FIGS. 13–20 are simplified diagrammatic views of a modification of the apparatuss of FIGS. 1–6 in which an auxiliary pressure chamber is incorporated.

As in the case of the apparatus of FIGS. 1-6 the apparatus of FIGS. 13-20 have provided means for stabilizing the fluid temperature and for extracting refrigeration through external loads, the arrangement in FIG. 13, corresponding to that of FIG. 1, in FIG. 14 to FIG. 2 and in FIGS. 15-20 to FIGS. 3-6. Likewise, the high-pressure and low-pressure reservoirs have compressors and coolers associated therewith (shown only in FIG. 13).

Figure 21:
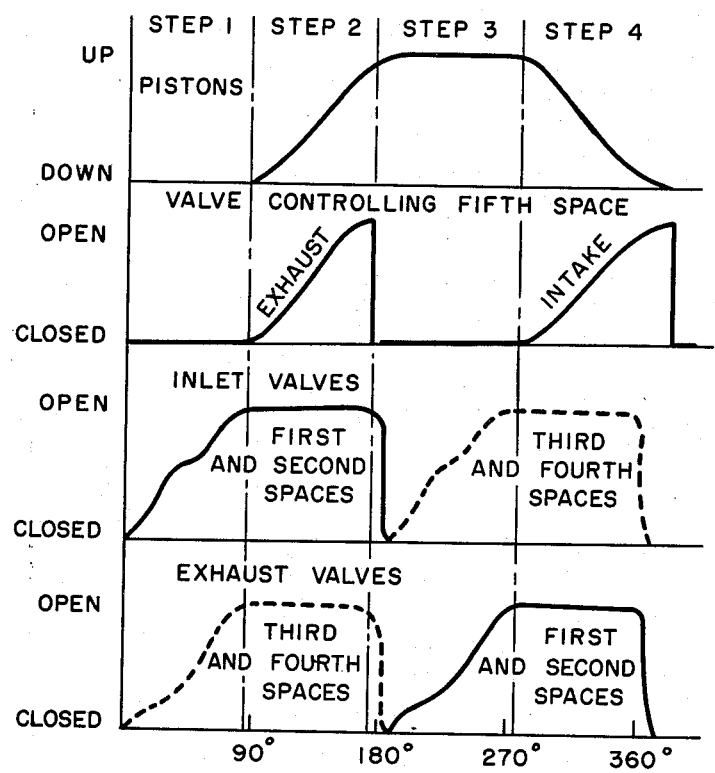
FIG. 21 illustrates a typical operational sequence for the cycle of the apparatus of FIGS. 13–20.

FIGS. 13-20 represent the steps of the basic cycle as they are performed by the apparatus which has an additional auxiliary chamber and associated piston. FIG. 21 is comparable to FIG. 8 and plots the movement of the pistons and the five principal valves (31, 33, 37, 39 and 74).

Figures 15, 16:
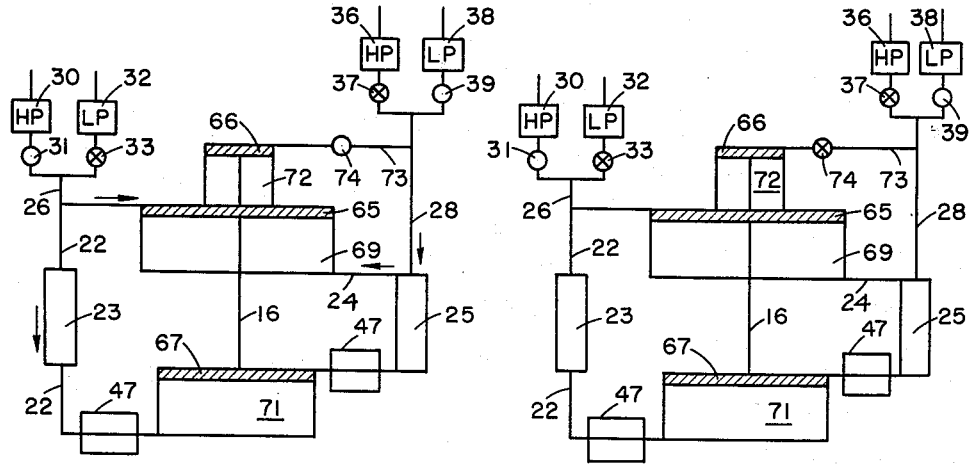
Figures 17, 18:
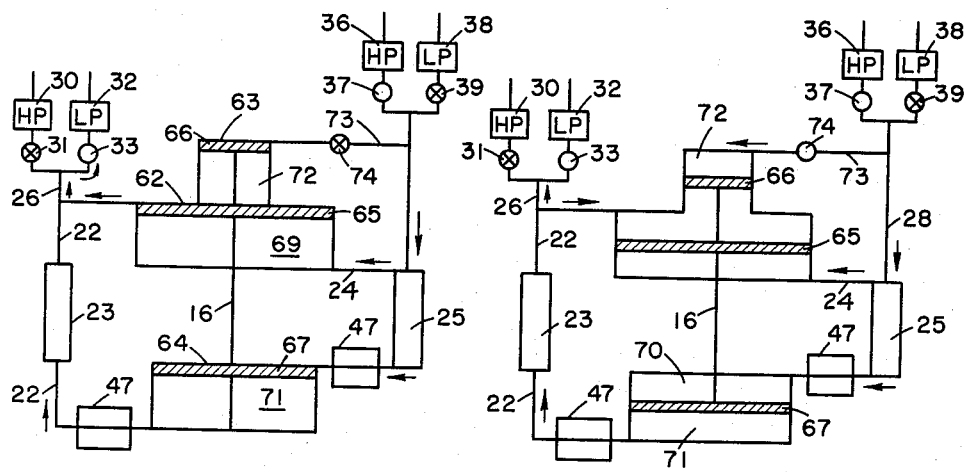
Figures 19, 20:
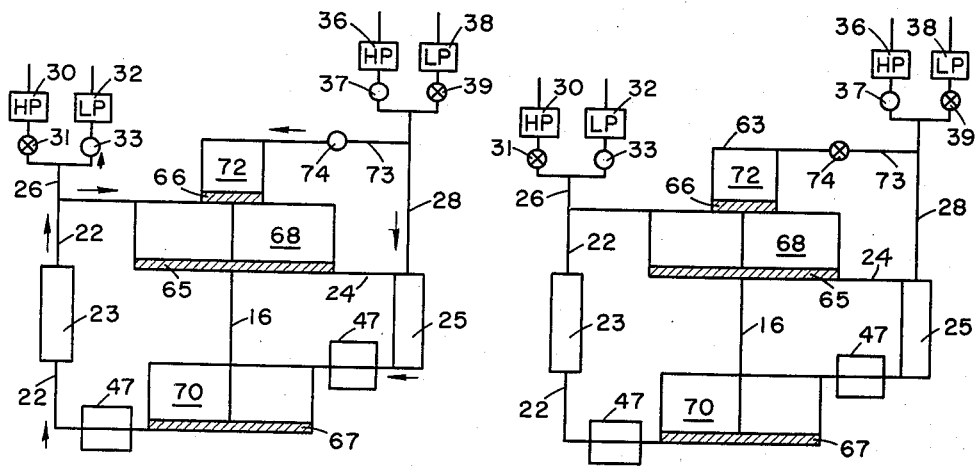

The cycle in FIGS. 13-20 is essentially the same as that described for FIGS. 1-6. In these drawings it will be seen that FIG. 13 corresponds to FIG. 1; FIG. 14 to FIG. 2; FIGS. 15 and 16 to FIG. 3; FIG. 17 to FIG. 4; FIG. 18 to FIG. 5; and FIGS. 19 and 20 to FIG. 6.

The essential difference between the cycle of FIGS. 1-6 and that of FIGS. 13-20 lies in the necessity for proper opening and closing of valve 74 which controls the flow of high-pressure fluid to auxiliary subchamber 72. As pointed out in the description of this apparatus it is required that the surface area of piston 65 be larger than that of piston 67 but smaller than the sum of that of pistons 67 and 66. It is therefore necessary to control valve 74 to properly balance the forces on the pistons to achieve the flow of fluids as described in connection with FIGS. 1-6.

Briefly it will be seen that in the beginning in step 1 valve 74 is closed and there is present in subchamber 72 high-pressure fluid. During the second step valve 74 is open and, with low-pressure valve 39 open, the high-pressure fluid of subchamber 72 is permitted to exhaust from the system. At the end of the second step (FIG. 16) valve 74 is closed and remains closed throughout the third step as shown in FIG. 17. As high-pressure fluid is introduced into subchambers 69 and 70 the valve 74 is open to balance the forces on the pistons and force the continued downward movement of the three pistons. Valve 74 also remains open during the fourth step during which low-pressure fluid is completely exhausted from subchamber 71 and high-pressure cold fluid is continued to be delivered to subchamber 70. At the end of this delivery of high-pressure fluid into subchamber 70 and subchamber 72, valve 74 is closed and there is present in this chamber the high-pressure fluid as indicated in the beginning of step 1.

Figures 22, 23:
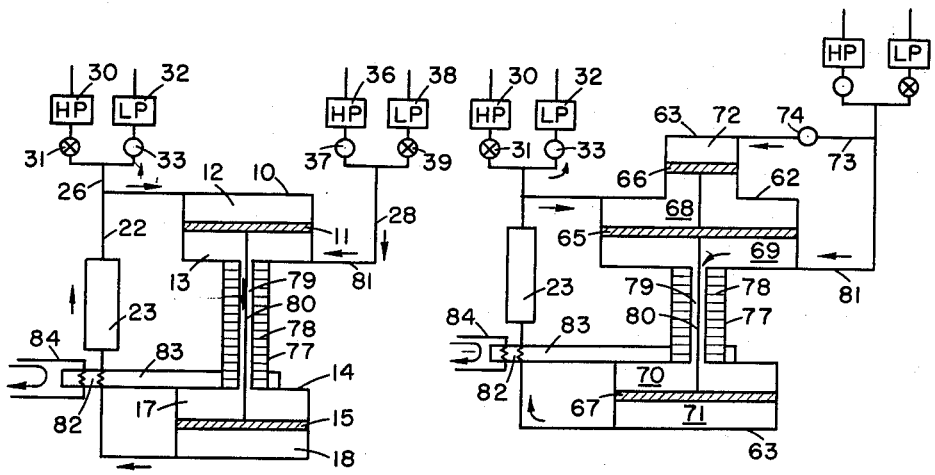
FIGS. 22 and 23 illustrate modifications of the basic apparatus as represented by FIGS. 1–6 and 13–20, respectively, illustrating how one of the heat exchange means in the form of a regenerator may serve as a physical connection between two of the subchambers.

FIGS. 22 and 23 illustrate yet another modification of the apparatus of this invention. In this modification the regenerator itself serves as the path or conduit between the lower subchamber of the warm chamber and the upper subchamber of the cold chamber. Thus in the apparatus of FIGS. 22 and 23 there is provided a regenerator 77 physically joining these chambers. This regenerator is conveniently packed with a material having a high heat capacity at the temperatures existing throughout the regenerator. The packing 78 may be, for example, copper screening, copper discs and the like which are suitably spaced by spacers not shown. There is provided through the packing of the regenerator 77 a vertical passage 79 through which connecting rod 80, which joins displacers 11 and 15, may be moved vertically. In this arrangement the external load represented as heat exchanger 82 is formed by a suitable thermal conduit 83 thermally bonded to the cold or lower end of the regenerator 77 and a heat transfer fluid line 84. The modification in FIG. 23 shows the use of the regenerator 77 in connection with apparatus similar to that illustrated in FIGS. 13-20. The basic cycle in the apparatus of FIGS. 22 and 23 is that which was described in connection with FIGS. 1-6 with the heat exchange between the fluids passing into and out of subchambers 17 and 13 (FIG. 22) or 69 and 70 (FIG. 23) taking place in the regenerator 77. Refrigeration is extracted from the system through a suitable heat exchanger 82 by the use of a heat transfer fluid circulated through conduit 84 and a thermal bond 83 between the bottom cold end of the regenerator 77 and the heat exchanger 82.

Figure 24:
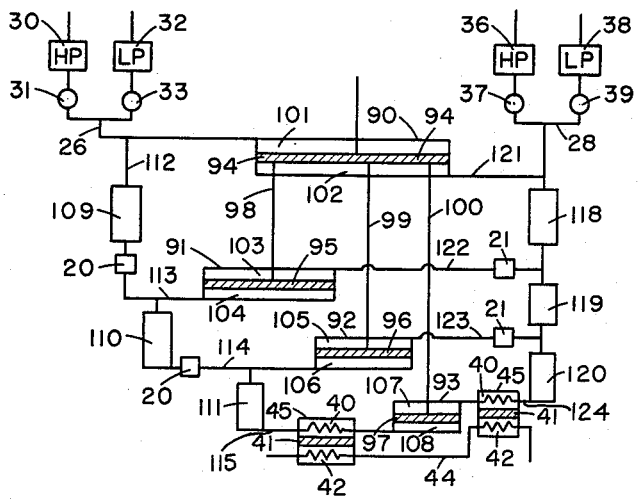
FIG. 24 illustrates one form of a multiple-displacer, double-acting apparatus.
Figure 25:
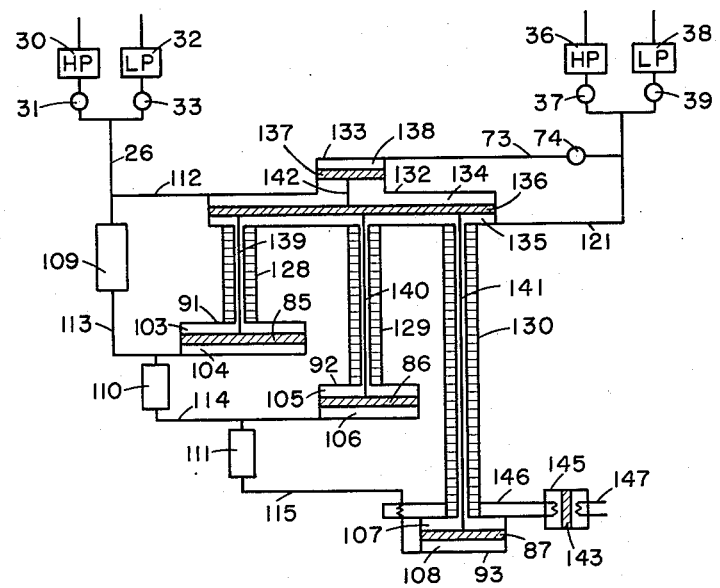
FIG. 25 is a modification of the apparatus of FIG. 24 in which portions of the heat exchange means in the form of regenerators serve as physical connections between some of the subchambers.

FIGS. 24 and 25 are directed to a modification of the apparatus in which there are multiple cold chambers, each successive chamber being maintained at a lower temperature than that above it. In this modification there is provided a warm chamber 90 and three cold chambers 91, 92 and 93. It will be understood that two or more such cold chambers may be used, the arrangement of three cold chambers in FIGS. 24 and 25 being illustrative and not limiting.

Within the chambers are displacers 94, 95, 96 and 97 which form essentially gas-tight seals with the chamber walls, thus dividing the chambers into subchambers as in the case of the apparatus of FIGS. 1-6. The surface areas of displacers 95, 96 and 97 should essentially equal that of displacer 94. Three essentially gas-tightly sealed connecting rods 98, 99 and 100 mechanically connect displacer 94 with displacers 95, 96 and 97, respectively. Warm chamber 90 is divided into upper and lower subchambers 101 and 102; while cold chamber 91 is divided into subchambers 103 and 104, cold chamber 92 into subchambers 105 and 106, and cold chamber 93 into subchambers 107 and 108.

There is provided in this arrangement a series of regenerators namely 109, 110 and 111, in passages 112, 113, 114 and 115, which successively connect the upper subchamber 101 of warm chamber 90 with lower subchambers 104, 106 and 108 of cold chambers 91, 92 and 93. In like manner regenerators 118, 119 and 120 in passages 121, 122, 123 and 124 form the required path between the lower subchamber 102 of warm chamber 90 with the upper subchambers 103, 105 and 107 of cold chambers 91, 92 and 93. Refrigeration is furnished and fluid temperature is stabilized by heat exchanger 45 as described in connection with FIG. 1. Additional heat stations 20 and 21 are shown and may be desirable but are not required.

In FIG. 24 the basic cycle is that which has been described in connection with FIGS. 1–6. In a multi-displacer apparatus, such as shown in FIG. 24, warm subchamber 101 is equivalent to subchamber 12 of FIG. 1 and subchamber 102 is equivalent to subchamber 13. In this modification subchambers 103, 105 and 107, which are progressively colder, are equivalent to cold subchamber 17 while subchambers 104, 106 and 108, which likewise are progressively colder, are equivalent to cold subchamber 18. In similar fashion regenerator 23 of FIG. 1 is replaced in this modification by three regenerators 109, 110 and 111 and regenerator 25 is replaced by three regenerators 118, 119 and 120. The high-pressure valves 31 and 37 and low-pressure valves 33 and 39 are controlled in the same manner as that described for the apparatus for FIGS. 1–6, and refrigeration is conveniently delivered through heat exchanger 45.

In FIG. 25 it will be seen that there is provided an apparatus in which regenerators 128, 129 and 130 serve as both the heat exchange means and as the connecting path between a portion of the warm chamber and the corresponding cold chambers of a multi-displacer arrangement. It will be appreciated that the apparatus of FIG. 25 is, in fact, the multi-displacer version of the apparatus shown in FIG. 23; and like that of the apparatus of FIG. 24, the use of three cold chambers with their associated pistons is not limiting since it is possible to use two or more.

The hot chamber 132 is divided into upper and lower subchambers 134 and 135 by the piston 136. Likewise pistons 85, 86 and 87 divide cold chambers 91, 92 and 93 into subchambers 103 and 104, 105 and 106, and 107 and 108, respectively. Auxiliary warm chamber 133 has associated with it a piston 137 which defines the volume 138.

Main piston 136 in the warm chamber is mechanically joined to pistons 95, 96 and 97 in the cold chambers through essentially gas-tightly sealed connecting rods 139, 140 and 141 and is joined to piston 137 through connecting rod 142. In order to balance the forces on the five pistons it is necessary that the surface area of piston 136 be greater than the sum of the surface areas of pistons 95, 96 and 97 but less than the sum of the surface areas of pistons 95, 96, 97 and 137. The magnitude of the differences in surface areas must be sufficient to overcome the inertia and friction forces encountered. Refrigeration is supplied through the use of a thermal conduit 146, thermally bonded to fluid conduit 115 and the bottom part of regenerator 130, and adapted to effect heat exchange to a thermal load 147 through heat exchanger 145 which may contain a mass 143 of lead or other thermally stabilizing material.

The cycle of FIG. 25 is related to that described for FIGS. 13–20 wherein subchamber 135 is equivalent to subchamber 69 of FIG. 13; subchamber 134 is equivalent to subchamber 68, and subchamber 138 is equivalent to subchamber 72. In the apparatus of FIG. 25 the cold fluid is moved to the progressively colder regenerators 128, 129 and 130 through the conduits 143 and 144.

It will be appreciated by anyone skilled in the art that it is also possible to employ the central regenerators of FIG. 25 with the chamber-displacer arrangement of FIG. 24 or to replace regenerators 118, 119 and 120 of FIG. 24 by central regenerators such as 128, 129 and 130 of FIG. 25.

Figure 26:
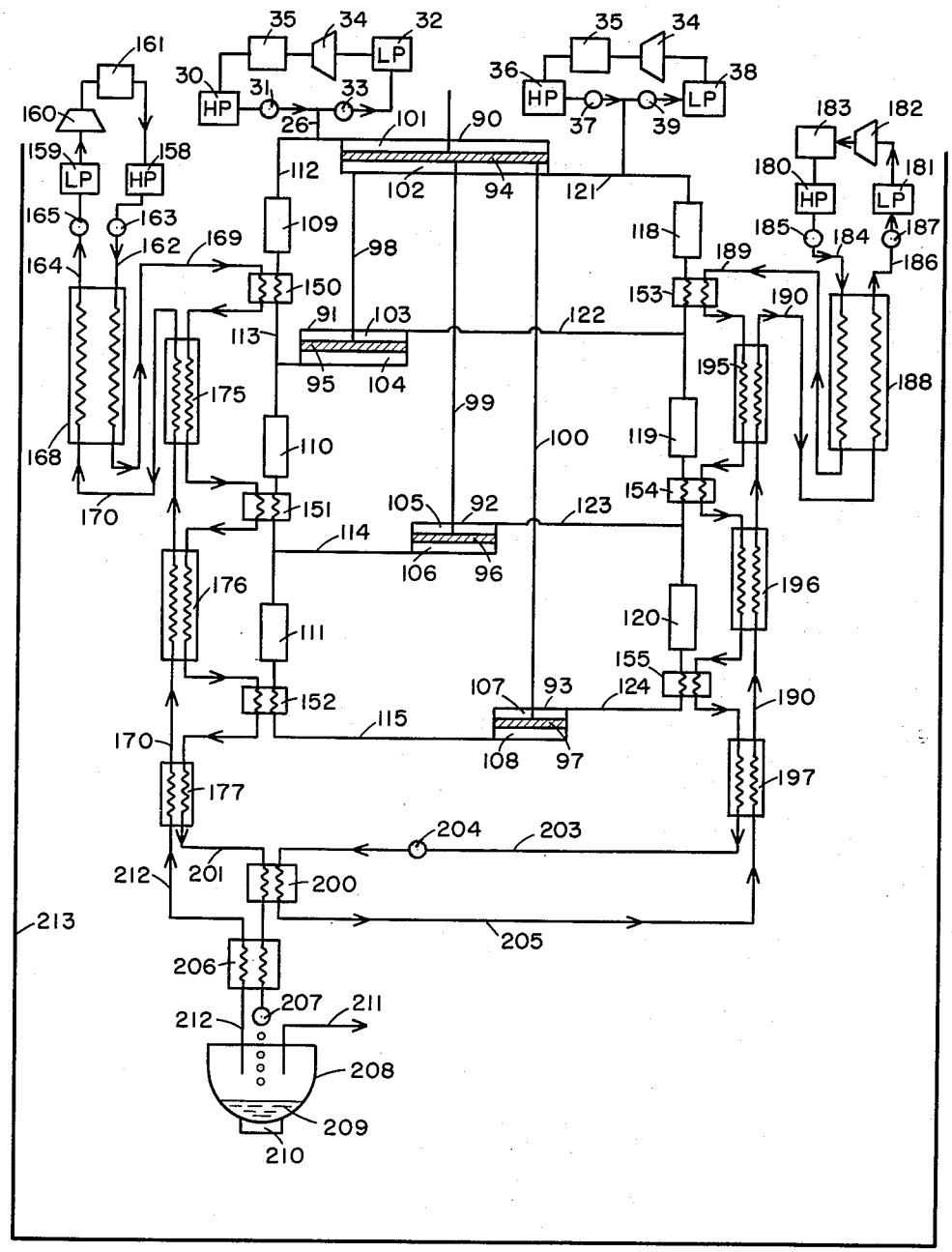
FIGS. 26 and 27 illustrate the use of auxiliary heat exchange systems in connection with the multiple-displacer, double-acting apparatus of FIGS. 24 and 25, respectively, the former showing the use of two different heat transfer fluids and the latter showing the use of a single heat transfer and refrigeration fluid.

The apparatus in FIG. 26 is a multi-displacer, double-acting refrigerator used in connection with auxiliary heat exchange systems and provides method and apparatus for liquefying helium, including $He^3$ as will be apparent in the following description of the apparatus and method. The modification of FIG. 26 is flexible in that it permits the use of separate refrigerating and heat transfer fluids. There are shown in this system four closed cycles, each of which may contain a different or the same working fluid, that in the refrigeration system being termed the "refrigerating fluids" and that in the heat transfer systems the "heat transfer fluids."

The basic refrigeration apparatus of FIG. 26 is the same as that described in connection with FIG. 24 wherein like numerals refer to like elements. In conjunction with this basic refrigeration cycle there are provided two heat transfer cycles. Turning first to that heat transfer cycle which is associated with the lower subchambers of the cold chambers (left-hand side of the diagram) it will be seen that there are provided heat exchangers 150, 151 and 152 associated with and part of conduits 113, 114 and 115 communicating with the lower subchambers 104, 106 and 108 of the cold chambers 91, 92 and 93. This heat transfer system contains a high-pressure reservoir 158 and a low-pressure reservoir 159 connected through a compressor 160 and a cooler 161. Fluid is fed from the high-pressure reservoir through conduit 162 controlled by valve 163 and returned to the low-pressure reservoir 159 via conduit 164 controlled by valve 165. There is provided a main heat exchanger 168 connected to inlet and outlet conduits 162 and 164. It will be seen that the high-pressure line 169 which carries the high-pressure fluid out of main heat exchanger 168 conducts the high-pressure fluid through heat exchangers 150, 151 and 152 by way of heat exchangers 175, 176 and 177 where heat is exchanged with a low-pressure fluid traveling in conduit 170.

Turning now to the other heat transfer system associated with the upper subchambers 103, 105 and 107 of the cold chambers 91, 92 and 93, it will be seen that comparable equipment is provided in heat exchangers 153, 154 and 155 comparing with heat exchangers 150, 151 and 152, respectively. Likewise a high-pressure reservoir 180 and a low-pressure reservoir 181 are provided and connected through a compressor 182 and a cooler 183. There is a high-pressure line 184, controlled by valve 185, and a low-pressure line 186, controlled by valve 187, communicating with a main heat exchanger 188. In like manner, high-pressure line 189 and low pressure line 190 connect with heat exchangers 195, 196 and 197.

The heat transfer fluids leave heat exchangers 177 and 197 under pressure by way of conduits 201 and 203. In conduit 203 there is provided a Joule-Thomson valve in which the high-pressure fluid entering by conduit 203 is in part liquefied and passes through heat exchanger 200 from which it leaves by conduit 205 to be returned as low-pressure fluid through heat exchangers 197, 196, 195 and 188. The high-pressure cold fluid in conduit 201 is brought into heat exchange relationship with the fluid (liquid and gas) expanded and cooled in the Joule-Thomson valve 204 in heat exchanger 200 where it is further cooled. Heat exchanger 206 followed by a second Joule-Thomson valve 207 permits partial liquefaction of the lower boiling point heat transfer fluid for collection in a liquid collection vessel 208. The liquid 209 is collected at the bottom of the vessel 208 and if rapid reboiling is desired there is provided a heater 210. At least the unliquefied portion of the fluid is returned via conduit 212 through heat exchanger 206 to heat exchanger 177. If it is desired to draw off liquid this may be done through draw-off line 211.

Figure 29:
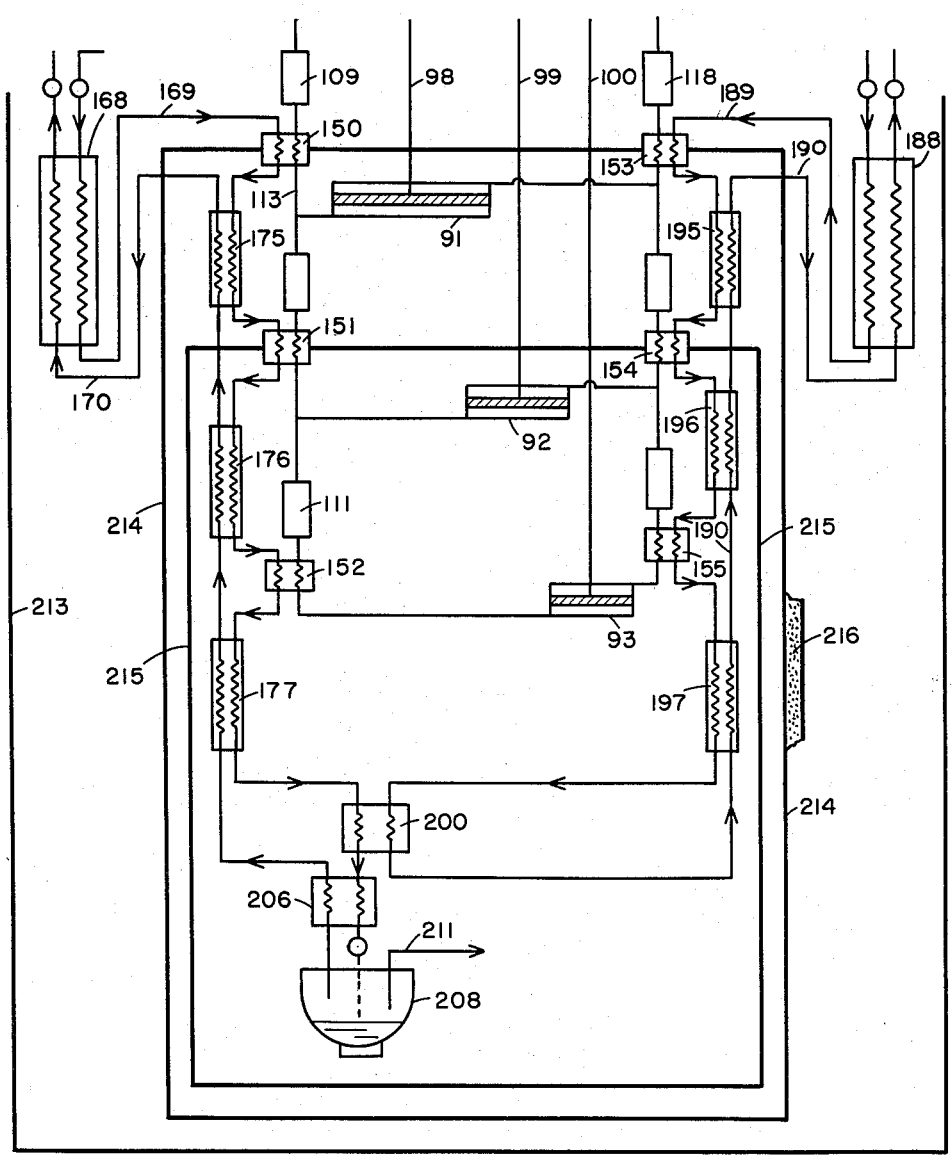
FIG. 29 illustrates in diagrammatic form the use of radiation shielding as part of an insulation system.
Figure 34:
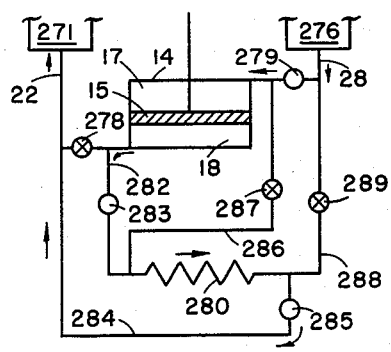
Figure 35:
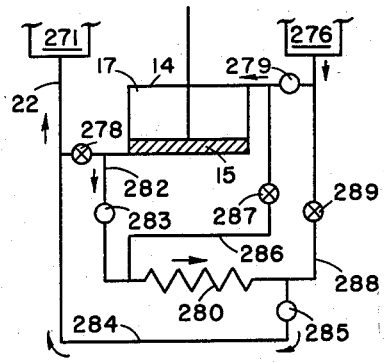

Insulation is provided to thermally insulate at least those portions of the equipment maintained at temperatures below ambient temperature. In FIG. 26 this insulation is shown to be an external shell 213 which is preferably evacuated. Where the apparatus is to be used to produce refrigeration at relatively low temperatures or to liquefy gases (e.g., hydrogen or helium) then additional protection against heat leaking in from the atmosphere should be provided. In FIG. 29 this additional protection is seen to take the form of one or more cooled radiation shields. Radiation shield 214 is thermally bonded to and cooled by heat exchangers 150 and 153 and is used to shield all the apparatus operating at temperatures below the temperature of the fluids circulating in heat exchangers 150 and 153. If desired, further protection may be realized by the use of a comparable radiation shield 215 thermally bonded to and cooled by heat exchangers 151 and 154. The radiation shields are conveniently constructed from a highly polished metal such as copper. In accordance with known insulation practice the radiation shields may have associated with them insulation material designed to absorb and reflect radiant energy such as shown fragmentarily as insulation packing 216 in FIG. 29.

In the operation of the apparatus of FIG. 26 the basic refrigeration cycle is identical to that of the apparatus of FIG. 24 which in essence is also that of FIGS. 1–6. These heat transfer cycles are relatively straightforward as will be apparent from an examination of this figure. Warm, high-pressure fluid is introduced into the cycle through valve 163 (looking first at the heat transfer system on the left-hand side) and is circulated through the system to be cooled by alternately passing through the heat exchangers 150, 151 and 152 associated with the three regenerators and the heat exchangers 175, 176 and 177 wherein there is countercurrent heat exchange with returning cold low-pressure fluid. In like manner a high-pressure heat transfer fluid enters the right-hand side system and is cooled by out-of-contact heat exchange with the refrigeration fluid in heat exchangers 153, 154 and 155, and with cold, low-pressure fluid in heat exchangers 195, 196 and 197.

The cycle illustrated in FIG. 26, which of course may be varied, illustrates how it is possible to employ two different heat exchange fluids and to deliver one in liquefied form. For purposes of illustration, assume $He^3$ is the heat transfer fluid in the left-hand side heat transfer cycle while $He^4$ is used as the heat transfer fluid in the right-hand side heat transfer cycle and as the refrigerating fluids.

After cooling the $He^4$ to a temperature just above its liquefaction point in heat exchanger 197, it is passed through Joule-Thomson valve 204 where it is partially liquefied and the liquid is then used to cool the cold high-pressure $He^3$ in heat exchanger 200. The liquid $He^4$ is revaporized in heat exchanger 200 and is returned by conduit 205 through the heat exchangers 197, 196 and 195 to cool incoming high-pressure fluid. Subsequent to the cooling of the $He^3$ in heat exchanger 200 it is passed through heat exchanger 206 where it is further cooled and finally passed through Joule-Thomson valve 207 where part of it is liquefied and collected as liquid 209 in vessel 208. The unliquefied $He^3$ is then returned through the heat transfer cycle to be used to cool the incoming high-pressure fluid. If desired some or all of the liquefied $He^3$ may be revaporized and returned with the unliquefied $He^3$.

In the cycle illustrated in FIG. 26 it is of course possible to use the same or different fluids in the refrigerating and heat transfer systems.

Figure 27:
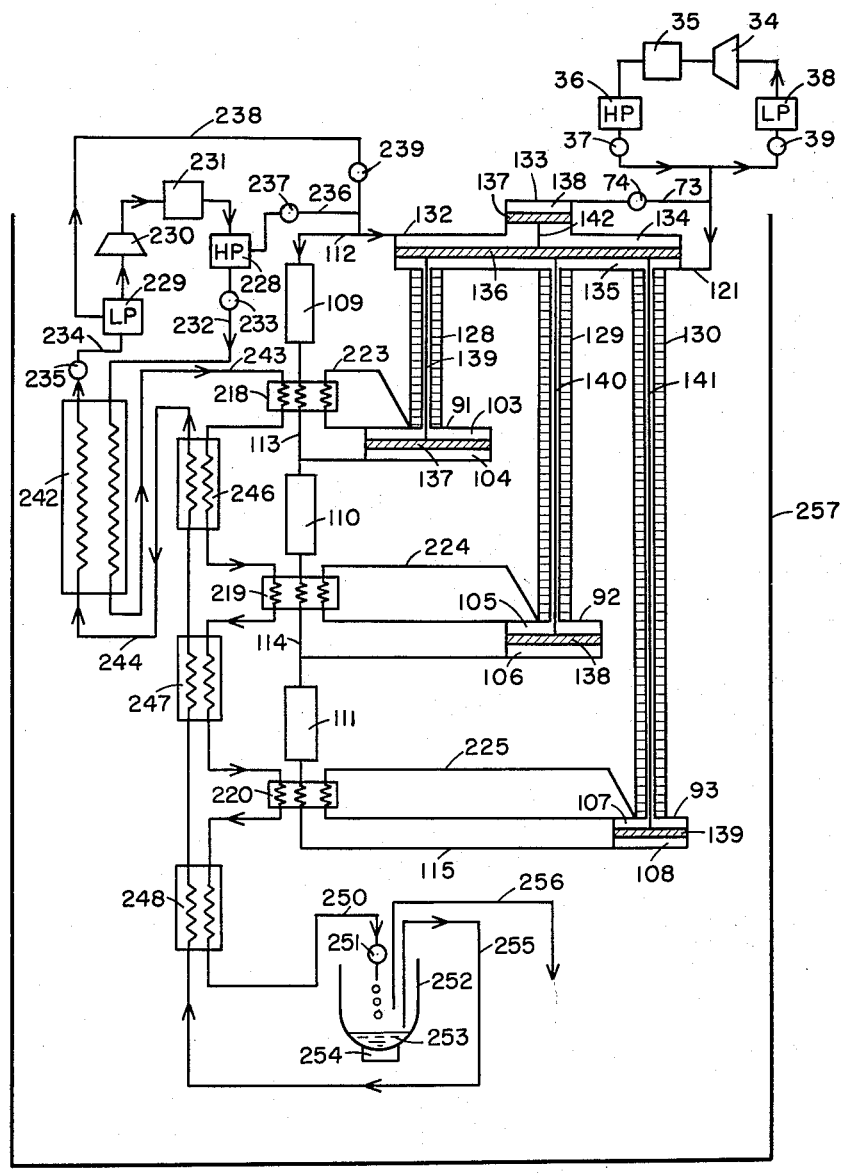

FIG. 27 illustrates the use of an auxiliary heat transfer system in conjunction with the multi-displacer apparatus of FIG. 25. In this embodiment there are provided heat exchangers 218, 219 and 220 which represent, in fact, the combining of heat exchangers 150 with 153, 151 with 154 and 152 with 153 as shown in FIG. 26; that is these heat exchangers of FIG. 27 serve both sides of the system. This arrangement then requires providing conduit loops 223, 224 and 225 between the bottom or cold ends of the regenerators 128, 129 and 130 with their respective upper subchambers 103, 105 and 107.

In the arrangement of FIG. 27 the same fluid is used as the heat transfer fluid and refrigerating fluid. Thus it is seen that it is necessary to provide only one high-pressure reservoir 228 and one low-pressure reservoir 229, these being joined through compressor 230 and cooler 231. High-pressure line 232, controlled by valve 233, introduces high-pressure fluid into the heat transfer system, while high-pressure line 236, controlled by valve 237, provides high-pressure fluid to the refrigeration portion of the apparatus. In like manner low-pressure line 234, controlled by valve 235, and line 238 controlled by valve 239 permit removal of low-pressure fluid from the heat exchange system as well as from the refrigeration system.

In the heat exchange system there is provided a main heat exchanger 242 from which high-pressure gas is conducted by means of line 243 and low-pressure fluid is returned through conduit 244. Heat exchangers 246, 247 and 248 provide for the necessary exchange of heat between the low-pressure and high-pressure fluids as will be evident from the diagram. If it is desired to employ apparatus to liquefy a portion of the gas there is provided apparatus for doing this, including conduit 250 which draws high-pressure cold fluid from heat exchanger 248 and which leads to a Joule-Thomson valve 251. The liquefied gas is collected in a liquid collection vessel 252 and the liquid 253 stored therein. If it is desired to revaporize this liquid the heater 254 is provided. Unliquefied gas and any revaporized cold low-pressure fluid is returned by means of conduit 255 through heat exchange system as in the case of FIG. 24. Liquefied gas may be withdrawn such as through a suitable draw-off line 256. Also as in the apparatus of FIG. 27 there is provided insulation 257 which should surround at least all of the cold portions of the refrigeration apparatus. The arrangement of cooled radiation shields shown in FIG. 29 may also be used to offer further protection from heat leaking in.

Figure 28:
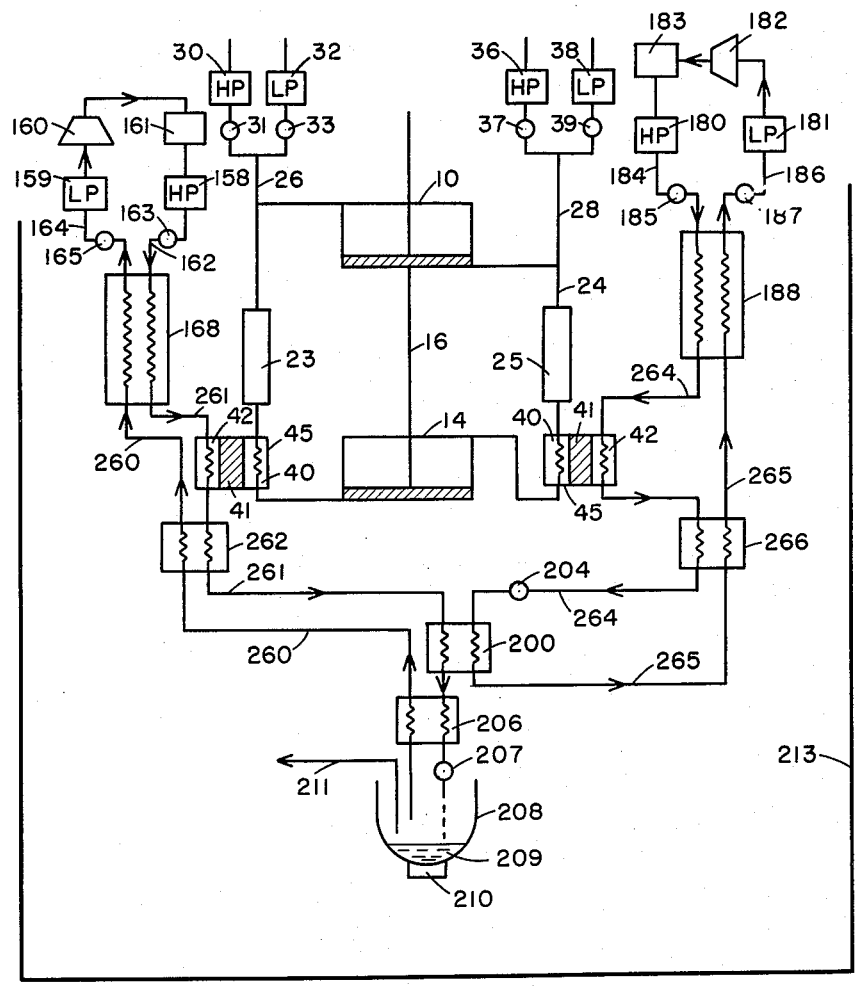
FIG. 28 illustrates the use of auxiliary heat exchange systems in connection with the basic apparatus of FIG. 1.

In the apparatus of FIGS. 26 and 27 the heat transfer systems were combined with multiple-stage refrigeration systems. However, it is also possible to combine heat transfer systems with the single-stage apparatus of FIGS. 1, 13, 22 and 23. FIG. 28 illustrates such a combination for the basic apparatus of FIG. 1 and is typical of such arrangement modifications. In FIG. 28, like numerals are used to refer to like elements in FIGS. 1 and 26. In place of a series of heat exchangers (175, 176 and 177 or 195, 196 and 197 of FIG. 26) there is but one heat exchanger 262, or 266, on each side of the cycle. High-pressure fluid conduit 261 passes through a heat station 45 and then heat exchanger 262, while low-pressure fluid conduit 260 passes through heat exchanger 262. Likewise high-pressure fluid conduit 264 and low-pressure fluid conduit 265 provide the required fluid flow path on the left-hand side heat transfer system.

The further cooling of one fluid by out-of-contact heat exchange with a partially liquefied fluid is accomplished as in the cycle described for FIG. 26. In the apparatus of FIG. 28 gases having boiling points above helium (e.g., hydrogen, B.P. 20.4° K.) may be used as the coolant fluid and helium as the refrigerating fluids.

In a manner similar to FIG. 27, a single fluid may be used as the refrigerating fluid and heat transfer fluid and it will be preferable in any apparatus of this type to surround at least the cold portion of the equipment with insulation. Radiation shields such as shown in FIG. 29 may also be used to decrease heat leaks.

Although the refrigeration method and apparatus of this invention are particularly well-adapted to miniaturization they may also be used to furnish refrigeration on a relatively large scale at very low temperatures. As an example it may be desirable to cool a large experimental chamber to as low as 20° K., that is approximately to the liquefaction point of liquid hydrogen. The double-acting feature of the refrigeration apparatus of this invention is particularly well adapted to furnishing large refrigeration loads at very low temperatures.

Figure 36:
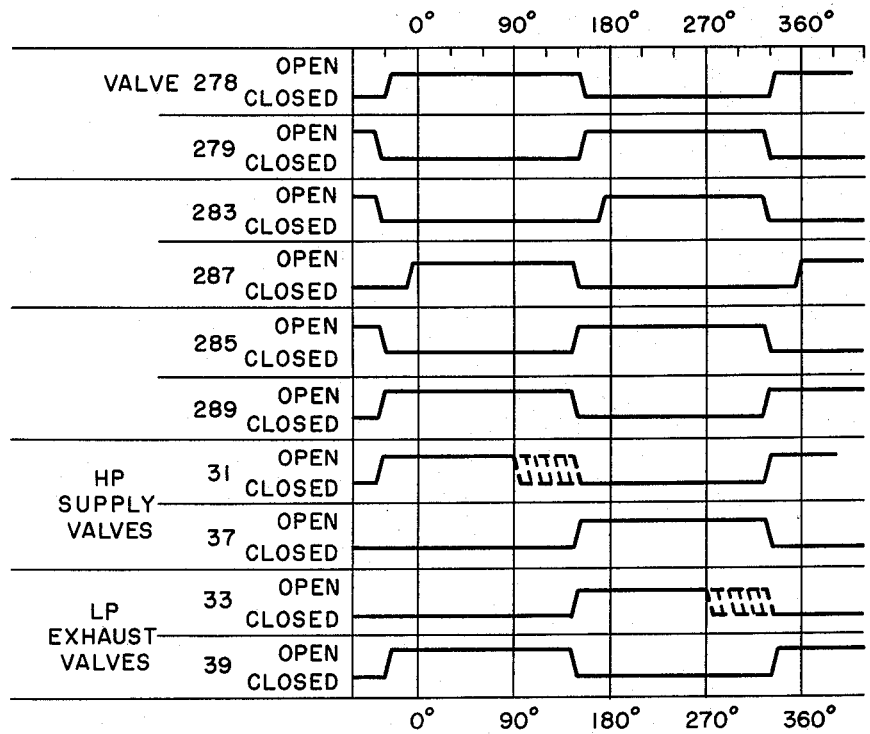
FIG. 36 illustrates a typical operational sequence for the cycle of the apparatus of FIGS. 30–35.

When large quantities of refrigeration are required from the method and apparatus of this invention some modifications in both the cycle and the apparatus components may be desirable as indicated in FIGS. 30–36. FIGS. 30–35 compare figure for figure with FIGS. 1–6. In drawing FIGS. 31–35 the upper chamber 10, the high-pressure and low-pressure fluid reservoirs, the coolers and compressors are not repeated since they are identical in each case with the corresponding apparatus of FIGS. 2–6, respectively. Also for purpose of simplification FIGS. 31–35 show only the bottom portion of the regenerators inasmuch as they are identical with those of FIG. 30. As in the case of FIGS. 1–6 an open circle indicates an open valve and a circle with an "x" in it indicates a closed valve. FIG. 36 is comparable to FIG. 8 and it shows the operation of the various valves, including those which control the flow of the high-pressure and low-pressure fluids from the supply reservoirs.

Turning now to FIG. 30, it will be seen that complete apparatus is illustrated in this figure. As in the basic apparatus of FIGS. 1–6, there are provided warm and cold chambers 10 and 14, displacers and corresponding high-pressure and low-pressure reservoirs. FIG. 30 illustrates a modification which may be made in the thermal storage means in the two passages. In such a modification the regenerators or heat storage means are divided into two sections with a heat station interposed between them. More particularly in FIG. 30 there are regenerators 270 and 271 with heat station 272 between them, all associated with conduit 22. In a similar fashion conduit 28 has associated with it regenerators 275 and 276 joined through a heat station 277. These heat stations are preferably constructed of materials having high heat conductivity at the temperature at which they are operated. They may also contain large masses of materials having high heat capacities serving as temperature stabilizers. Thus, for example, they may be stacked copper disks surrounded by lead. It will be appreciated that these series of regenerators and heat stations replace regenerators 23 and 25 of FIG. 1.

As in the case of the apparatus of FIG. 1 conduit 22 communicates with the lower subchamber 18 and conduit 28 with the upper subchamber 17. However, in the apparatus of FIG. 30 these conduits have valves 278 and 279, the purpose of which will be described later in the description of the cycle. The external load to be refrigerated is represented by heat transfer coils 280 which may of course be in any suitable form for out-of-contact heat exchange capable of delivering the necessary refrigeration to the external load. Connecting conduit 22 and external load 280 is a conduit 282 which is controlled by valve 283. This conduit provides for the introduction of cold fluid from lower subchamber 18 into heat exchanger 280. The fluid from subchamber 18 after passage through heat exchanger 280 is returned to conduit 22 and hence to the refrigeration system through conduit 284 which is controlled by valve 285. In similar manner cold fluid is supplied from upper subchamber 17 to heat exchanger 280 through conduit 286 controlled by valve 287, and returned from heat exchanger 280 to conduit 28 and the refrigeration system through conduit 288 controlled by valve 289.

Inasmuch as pre-cooling of a system which is to deliver refrigeration in the range of 20° K. is not only desirable but usually required, pre-cooling coils 293 are provided for circulating a cooling liquid such as liquefied nitrogen. These preferably surround a radiation shield 292 which is also in thermal contact with and hence cooled by heat stations 272 and 277. The radiation shield may be of a shiny metallic material, e.g., aluminum or copper, such as the radiation shields 214 and 215 shown in FIG. 29.

The cycle represented by FIGS. 30–35 follows that of the cycle shown and described with reference to FIGS. 1–6. The difference lies in the fact that the final expansion of the cold fluids discharged from subchambers 17 and 18 takes place by way of heat exchanger 280. This then necessitates the control of these fluids in the manner illustrated in FIG. 36.

As in the case of the basic cycle the pressure is built up in cold subchamber 18 while high-pressure cold fluid is discharged from cold subchamber 17. However, instead of effecting expansion of the cold fluid to achieve final cooling by permitting it to return directly to the low-pressure reservoir 38, the cold high-pressure fluid from subchamber 17 is directed through heat exchanger 280. This of course is accomplished by opening valve 289 and then subsequently valve 287. It will be seen in FIG. 36 that valves 289 and 39 are opened somewhat before valve 287 to insure transfer and immediate expansion of the fluid through the system into low-pressure reservoir 38. Thus, with the movement of displacer 15 upwardly in FIGS. 30, 31 and 32 the cold fluid which was in subchamber 17 is expanded and transferred to low-pressure reservoir 38. During expansion the fluid of course travels upwardly through regenerators 276 and 275 where heat is stored and the fluid is raised to temperature $T_{SO_{3+4}}$ as indicated in FIG. 7. During the delivery of refrigeration to external load 280 by the cold fluid discharged from subchamber 17, valve 279 is closed to prevent any of the cold fluid from returning directly to the refrigeration system through regenerator 276.

Simultaneously with the delivery of cold fluid from subchamber 17 high-pressure fluid is being built up into subchamber 18 after having been initially cooled by passage through regenerators 270 and 271 and heat station 272. This of course requires that valve 278 be open to permit entry of fluid in subchamber 18 and that valves 283 and 285 are closed. With the essentially complete discharge of cold fluid from subchamber 17 and build up of high-pressure cold fluid in subchamber 18 the system is in a condition to be reversed and this is illustrated in FIG. 33. Again, as in the case of the valve operation described above, low-pressure reservoir valve 33 and valve 285 are opened somewhat prior to the opening of valve 283 in order to balance pressures and insure the immediate transfer of fluid and expansion of fluid into low-pressure reservoir 32 by way of heat exchanger 280. During the transfer of the cold fluid from subchamber 18 to heat exchanger 280 and subsequently to low-pressure reservoir 32 valve 279 is open to permit high-pressure fluid to flow into subchamber 17. This means, of course, that valves 287 and 289 are closed and remain closed until all of the cold fluid has been discharged from subchamber 18 and an additional quantity of initially cooled fluid is built up in subchamber 17. At this point the cycle is in a condition to begin again.

FIG. 36 also illustrates that it is possible to close the high-pressure supply valves 31 and 37 over the period of time indicated by the cross-hatched portion in FIG. 36. This means that there is some choice in the operation of the high-pressure supply valves which in turn controls the extent to which the fluid pressure is built up in the cold subchambers 17 and 18.

In the apparatus of this invention there is complete or substantially complete isolation of the warm and cold portions of the refrigerator. This isolation is achieved through the use of a novel cycle in which high-pressure and low-pressure fluids are employed simultaneously. Net refrigeration is extracted essentially solely as thermal energy and the cycle achieves high thermodynamic efficiencies.

Figure 37:
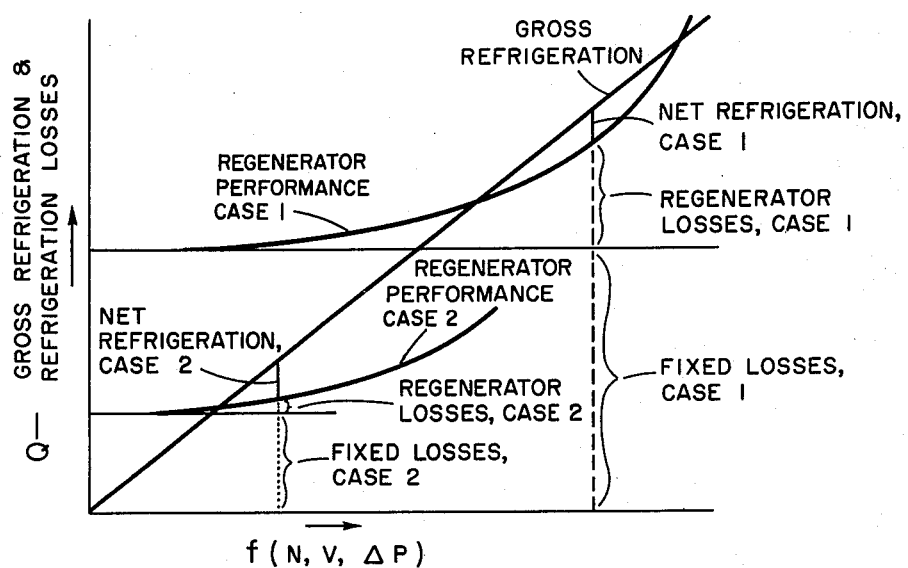
FIG. 37 is a plot of refrigerator performance showing the influence of fixed losses on refrigeration efficiency.

The reason for the achievement of the improved thermodynamic efficiencies can best be shown with reference to FIG. 37 in which total work output of a refrigeration system is plotted against increasing values of various operational parameters of which the performance of the refrigerator is a function. These operational parameters are reciprocating speed of the displacer (N), swept volume of the apparatus (V) and pressure difference (P); and they all combine to determine the mass flow within the system.

To begin with, a thermal system such as a refrigerator has a gross refrigeration which may be represented, for purposes of illustration, as the solid diagonal line in FIG. 37. This gross refrigeration of such a system increases with increasing mass flow and is defined by a fairly well established relationship. The difference between this gross refrigeration and the total heat losses experienced by the system is net refrigeration. The heat losses in turn are made up of so-called "fixed" losses which can be considered to be substantially invariable with respect to the operational parameters, and of regenerator losses which are a function of these operational parameters. The fixed losses are a function of T which is the difference in temperature between ambient or room temperature and the temperature of the cold end of the refrigerator. The regenerator losses are, in turn, a function of mass flow.

Assume for purposes of discussion two cases: case 1 being a system in which the fixed losses are much greater than in case 2. These two situations are represented diagrammatically in FIG. 37. Let case 1 represent the prior art type of refrigerators delivering a fixed net refrigeration. Now it is evident that by reducing the fixed losses (case 2), the gross refrigeration required for the fixed net refrigeration is less and so the regenerators required can be made smaller, i.e., can be made to handle a smaller mass flow. A primary consequence of the use of a smaller regenerator is that its own losses are reduced, hence a further saving in gross refrigeration requirement for a given net refrigeration is realized.

Moreover, the temperature stability of the cold end of the refrigerator is less influenced by changes in ambient temperature because those fixed losses which are primarily a function only of the temperature difference (T) between the warm end and cold ends are greatly reduced; while regenerator losses, being a function of mass flow, are more dependent upon the cold end temperature and less dependent upon T. Thus, by decreasing fixed losses greater operational stability and more reliable control are possible.

The method and apparatus of this invention achieve a marked decrease in fixed losses thus realizing the situation for case 2 of FIG. 37. This marked decrease in fixed losses is brought about by the virtual elimination of motional heat transfer which is the heat transferred by a displacer in its moving from the hot to the cold end of a refrigeration cylinder. Such heat transfer necessarily causes heat losses at both ends. In the cycle and apparatus illustrated in U.S. Patent 2,966,035 it has been found that the losses caused by this motional heat transfer can amount to as much as 50% of the total refrigerator output in small units. In the apparatus of this invention the motional heat transfer is almost completely eliminated by the complete separation of warm and cold ends, and the full benefit of the use of regenerators or regenerators in combination with countercurrent heat exchangers can be realized.

It will, therefore, be appreciated that the improved performance achieved by the method and apparatus of this invention is not a matter of degree but is a matter of providing a refrigeration system in which fixed losses and regenerator losses are rebalanced to achieve optimum operating conditions. The refrigeration cycle is more stable and less sensitive to ambient conditions.

It is apparent that the method and apparatus of this invention are flexible both with respect to the level of refrigeration which can be attained and to the adaptability of the refrigerator to many uses and with many different devices.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:
1. Refrigeration method, comprising the following steps:
   (a) delivering high-pressure fluid from a high-pressure fluid source into communicating first and second spaces and compressing residual low-pressure fluid in said first space thereby to heat said residual fluid, while simultaneously discharging high-pressure fluid from communicating third and fourth enclosed spaces into a low-pressure region, thereby cooling said fluid in said fourth space;
   (b) continuing delivery of said high-pressure fluid from said high-pressure fluid source and transferring heated fluid from said first space to said second space, while simultaneously continuing discharging fluid from said fourth space thereby reducing its pressure to that of said low-pressure region and supplying fluid to said third space where it becomes residual fluid;
   (c) throughout delivery and discharge in steps (a) and (b) extracting heat from said high-pressure fluid thereby to cool it initially and transferring heat to the low-pressure fluid thereby to heat it initially;
   (d) expanding said high-pressure fluid in said second space to cool it further by discharging it into a low-pressure region, while simultaneously supplying high-pressure fluid from a high-pressure fluid source to said third and fourth spaces and compressing said residual low-pressure fluid in said third space delivered thereto in step (b) thereby to heat said residual fluid;
   (e) continuing transfer of fluid from said second space thereby reducing its pressure to that of said low-pressure region and supplying fluid to said first space to become said low-pressure residual fluid of step (a) while simultaneously continuing delivery of said high-pressure fluid from said high-pressure fluid source and transferring heated fluid from said third space to said fourth space; and
   (f) throughout discharge and delivery in steps (d) and (e) transferring heat to the low-pressure fluid to heat it initially while extracting heat from said high-pressure fluid to cool it initially, thereby establishing the conditions to begin step (a);
   said first and third spaces forming a single warm zone, the total volume of which remains constant, the volume of each of said first and third spaces varying during the cycle; and said second and fourth spaces forming a single cold zone, the total volume of which remains constant, the volume of each of said second and fourth spaces varying during the cycle from essentially zero to the total volume of said cold zone.

2. Method in accordance with claim 1 wherein extracting and transferring heat in steps (c) and (f) comprises storing heat along paths joining said first and second spaces and said third and fourth spaces during delivery of high-pressure fluid and giving up heat along said paths during discharge of low-pressure fluid.

3. Method in accordance with claim 1 wherein extracting and transferring heat in steps (c) and (f) comprises interchanging heat between said high-pressure fluid and said low-pressure fluid during delivery and discharge to and from said second and fourth spaces.

4. Method in accordance with claim 1 wherein extracting and transferring heat in steps (c) and (f) comprises a combination of storing heat along paths joining said first and second spaces and said third and fourth spaces during delivery of high-pressure fluid and giving up heat along said paths during discharge of low-pressure fluid, and of interchanging heat between said high-pressure fluid and said low-pressure fluid during delivery and discharge to and from said second and fourth spaces.

5. Method in accordance with claim 1 including the step of contacting said fluids with an essentially constant-temperature surface prior to their delivery to and subsequent to their discharge from said second and fourth spaces.

6. Method in accordance with claim 1 including the step of delivering refrigeration to an external load.

7. Refrigeration method, comprising the following steps:
   (a) delivering high-pressure fluid from a high-pressure fluid source into communicating first and second spaces and compressing residual low-pressure fluid in said first space thereby to heat said residual fluid, while simultaneously discharging high-pressure fluid from communicating third and fourth enclosed spaces into a low-pressure region, thereby cooling said fluid in said fourth space; and maintaining high-pressure fluid in a fifth enclosed space;
   (b) continuing delivery of said high-pressure fluid from said high-pressure fluid source and transferring heated fluid from said first space to said second space, while simultaneously continuing discharging fluid from said fourth space thereby reducing its pressure to that of said low-pressure region and supplying fluid to said third space where it becomes residual low-pressure fluid, and discharging high-pressure fluid from said fifth enclosed space;
   (c) throughout delivery and discharge of said fluids to said second space and from said fourth space in steps (a) and (b) extracting heat from said high-pressure fluid thereby to cool it initially and transferring heat to the low-pressure fluid thereby to heat it initially;
   (d) expanding said high-pressure fluid in said second space to cool it further by discharging it into a low-pressure region, while simultaneously supplying high-pressure fluid from a high-pressure fluid source to said third, fourth and fifth spaces and compressing said residual low-pressure fluid in said third space delivered thereto in step (b) thereby to heat said residual fluid;
   (e) continuing transfer of fluid from said second space thereby reducing its pressure to that of said low-pressure region and supplying fluid to said first space to become said low-pressure residual fluid of step (a) while simultaneously continuing delivery of said high-pressure fluid from said high-pressure fluid source and transferring heated fluid from said third space to said fourth space, and building up high-pressure fluid in said fifth space to provide that required in step (a); and
   (f) throughout discharge and delivery of said fluids from said second space and to said fourth space in steps (d) and (e) transferring heat to the low-pressure fluid to heat it initially while extracting heat from said high-pressure fluid to cool it initially, thereby establishing the conditions to begin step (a);
   said first, third and fifth spaces forming a single warm zone the total volume of which remains constant, the fluid in said fifth space being used to control the relative volumes of said first and third spaces; and said second and fourth spaces forming a single cold zone, the total volume of which remains constant, the volume of each of said second and fourth spaces varying during the cycle from essentially zero to the total volume of said cold zone.

8. Refrigeration method, comprising the following steps:
   (a) delivering high-pressure fluid from a high-pressure fluid source into a first enclosed space and into a series of successive second enclosed spaces communicating with said first enclosed space, each of said second enclosed spaces being maintained at a temperature lower than the preceding one, and compressing residual low-pressure fluid in said first space thereby to heat said residual fluid, while simultaneously discharging high-pressure fluid from a third enclosed space and from a series of successive fourth enclosed spaces communicating with said third enclosed space, each of said fourth enclosed spaces being maintained at a temperature lower than the preceding one, into a low-pressure region, thereby cooling said fluid in said fourth spaces;
   (b) continuing delivery of said high-pressure fluid from said high-pressure fluid source and transferring heated fluid from said first space to said series of second spaces, while simultaneously continuing discharging fluid from said series of fourth spaces thereby reducing its pressure to that of said low-pressure region and supplying fluid to said third space where it becomes residual low-press fluid;
   (c) throughout delivery and discharge in steps (a) and (b) extracting heat from said high-pressure fluid thereby to cool it initially and transferring heat to the low-pressure fluid thereby to heat it initially;
   (d) expanding said high-pressure fluid in said series of second spaces to cool it further by discharging it into a low-pressure region, while simultaneously supplying high-pressure fluid from a high-pressure fluid source to said third space and said series of fourth spaces and compressing said residual low-pressure fluid in said third space delivered thereto in step (b) thereby to heat said residual fluid;
   (e) continuing transfer of fluid from said series of second spaces thereby reducing its pressure to that of said low-pressure region and supplying fluid to said first space to become said low-pressure residual fluid of step (a), while simultaneously continuing delivery of said high-pressure fluid from said high-pressure fluid source and transferring heated fluid from said third space to said series of fourth spaces; and
   (f) throughout discharge and delivery in steps (d) and (e) transferring heat to the low-pressure fluid to heat it initially while extracting heat from said high-pressure fluid to cool it initially, thereby establishing the conditions to begin step (a);
   said first and third spaces forming a single warm zone, the total volume of which remains constant, the volume of each of said first and third spaces varying during the cycle.

9. Method in accordance with claim 8 including the step of contacting said fluids with an essentially constant temperature surface prior to their delivery to and subsequent to their discharge from said series of second and fourth spaces.

10. Refrigeration method, comprising the following steps:
   (a) delivering high-pressure fluid from a high-pressure fluid source into a first enclosed space and into a series of successive second enclosed spaces communicating with said first enclosed space, each of said second enclosed spaces being maintained at a temperature lower than the preceding one, and compressing residual low-pressure fluid in said first space thereby to heat said residual fluid, while simultaneously discharging high-pressure fluid from a third enclosed space and from a series of successive fourth enclosed spaces communicating with said third enclosed space, each of said fourth enclosed spaces being maintained at a temperature lower than the preceding one, into a low-pressure region, thereby cooling said fluid in said fourth spaces, and maintaining high-pressure fluid in a fifth enclosed space;

(b) continuing delivery of said high-pressure fluid from said high-pressure fluid source and transferring heated fluid from said first space to said series of second spaces, while simultaneously continuing discharging fluid from said series of fourth spaces thereby reducing its pressure to that of said low-pressure region and supplying fluid to said third space where it becomes residual low-pressure fluid, and discharging high-pressure fluid from said fifth enclosed space;

(c) throughout delivery and discharge of said fluids to said second spaces and from said fourth spaces in steps (a) and (b) extracting heat from said high-pressure fluid thereby to cool it initially and transferring heat to the low-pressure fluid thereby to heat it initially;

(d) expanding said high-pressure fluid in said series of second spaces to cool it further by discharging it into a low-pressure region, which simultaneously supplying high-pressure fluid from a high-pressure fluid source to said third space and said series of fourth spaces and said fifth space and compressing said residual low-pressure fluid in said third space delivered thereto in step (b) thereby to heat said residual fluid;

(e) continuing transfer of fluid from said series of second spaces thereby reducing its pressure to that of said low-pressure region and supplying fluid to said first space to become said low-pressure residual fluid of step (a) while simultaneously continuing delivery of said high-pressure fluid from said high-pressure fluid source and transferring heated fluid from said third space to said series of fourth spaces, and building up high-pressure fluid in said fifth space to provide that required in step (a); and (f) throughout discharge and delivery of said fluids from said second spaces and to said fourth space in steps (d) and (e) transferring heat to the low-pressure fluid to heat it initially while extracting heat from said high-pressure fluid to cool it initially, thereby establishing the conditions to begin step (a);

said first, third and fifth spaces forming a single warm zone the total volume of which remains constant, the fluid in said fifth space being used to control the relative volumes of said first and third spaces; and each of said second spaces forming with a fourth space a cold zone of constant volume, the volume of each of said second spaces and its respective fourth space varying during the cycle from essentially zero to the total volume of the cold zone which they constitute.

11. The fluid refrigeration method comprising a refrigeration cycle and a heat transfer cycle, said refrigeration cycle comprising the steps of:

(a) delivering high-pressure fluid from a high-pressure fluid source into a first enclosed space and into a series of successive second enclosed spaces communicating with said first enclosed space, each of said second enclosed spaces being maintained at a temperature lower than the preceding one, and compressing residual low-pressure fluid in said first space thereby to heat said residual fluid, while simultaneously discharging high-pressure fluid from a third enclosed space and from a series of successive fourth enclosed spaces communicating with said third enclosed space, each of said fourth enclosed spaces being maintained at a temperature lower than the preceding one, into a low-pressure region, thereby cooling said fluid in said fourth spaces;

(b) continuing delivery of said high-pressure fluid from said high-pressure fluid source and transferring heated fluid from said first space to said series of second spaces, while simultaneously continuing discharging fluid from said series of fourth spaces thereby reducing its pressure to that of said low-pressure region and supplying fluid to said third space where it becomes residual low-pressure fluid;

(c) throughout delivery and discharge in steps (a) and (b) extracting heat from said high-pressure fluid thereby to cool it initially and transferring heat to the low-pressure fluid thereby to heat it initially;

(d) expanding said high-pressure fluid in said series of second spaces to cool it further by discharging it into a low-pressure region, while simultaneously supplying high-pressure fluid from a high-pressure fluid source to said third space and said series of fourth spaces and compressing said residual low-pressure fluid in said third space delivered thereto in step (b) thereby to heat said residual fluid;

(e) continuing transfer of fluid from said series of second spaces thereby reducing its pressure to that of said low-pressure region and supplying fluid to said first space to become said low-pressure residual fluid of step (a), while simultaneously continuing delivery of said high-pressure fluid from said high-pressure fluid source and transferring heated fluid from said third space to said series of fourth spaces; and (f) throughout discharge and delivery in steps (d) and (e) transferring heat to the low-pressure fluid to heat it initially while extracting heat from said high-pressure fluid to cool it initially, thereby establishing the conditions to begin step (a);

said first and third spaces forming a single warm zone, the total volume of which remains constant, the volume of each of said first and third spaces varying during the cycle;

said heat transfer cycle comprising the steps of (a) introducing into a heat transfer system high-pressure heat transfer fluid to initially cool it by out-of-contact heat exchange with low-pressure returning heat transfer fluid;

(b) progressively further cooling said high-pressure heat transfer fluid by out-of-contact heat exchange with the fluids circulated in said refrigeration cycle;

(c) expanding the further-cooled heat transfer fluid to finally cool it; and (d) recycling at least a portion of the resulting finally-cooled low-pressure heat transfer fluid in out-of-contact heat exchange with said high-pressure heat transfer fluid introduced into said heat transfer system in step (a) of said heat transfer cycle.

12. Method in accordance with claim 11 wherein the fluids in said refrigeration cycle and said heat transfer cycle are different.

13. The fluid refrigeration method comprising a refrigeration cycle and a heat transfer cycle, said refrigeration cycle comprising the steps of (a) delivering high-pressure fluid from a high-pressure fluid source into a first enclosed space and into a series of successive second enclosed spaces communicating with said first enclosed space, each of said second enclosed spaces being maintained at a temperature lower than the preceding one, and compressing residual low-pressure fluid in said first space thereby to heat said residual fluid, while simultaneously discharging high-pressure fluid from a third enclosed space and from a series of successive fourth enclosed spaces communicating with said third enclosed space, each of said fourth enclosed spaces being maintained at a temperature lower than the preceding one, into a low-pressure region, thereby cooling said fluid in said fourth spaces;

(b) continuing delivery of said high-pressure fluid from said high-pressure fluid source and transferring heated fluid from said first space to said series of second spaces, while simultaneously continuing discharging fluid from said series of fourth spaces thereby reducing its pressure to that of said low-pressure region and supplying fluid to said third space where it becomes residual low-pressure fluid;

(c) throughout delivery and discharge in steps (a) and (b) extracting heat from said high-pressure fluid thereby to cool it initially and transferring heat to the low-pressure fluid thereby to heat it initially;

(d) expanding said high-pressure fluid in said series of second spaces to cool it further by discharging it into a low-pressure region, while simultaneously supplying high-pressure fluid from a high-pressure fluid source to said third space and said series of fourth spaces and compressing said residual low-pressure fluid in said third space delivered thereto in step (b) thereby to heat said residual fluid;

(e) continuing transfer of fluid from said series of second spaces thereby reducing its pressure to that of said low-pressure region and supplying fluid to said first space to become said low-pressure residual fluid of step (a) while simultaneously continuing delivery of said high-pressure fluid from said high-pressure fluid source and transferring heated fluid from said third space to said series of fourth spaces; and (f) throughout discharge and delivery in steps (d) and (e) transferring heat to the low-pressure fluid to heat it initially while extracting heat from said high-pressure fluid to cool it initially, thereby establishing the conditions to begin step (a);

said first and third spaces forming a single warm zone, the total volume of which remains constant, the volume of each of said first and third spaces varying during the cycle;

said heat transfer cycle comprising the steps of (a) introducing a first high-pressure heat transfer fluid into a first heat transfer system associated with said first space and said series of second spaces of said refrigeration cycle, while simultaneously introducing a second high-pressure heat transfer fluid into a second heat transfer system associated with said second space and said series of fourth spaces of said refrigeration cycle to initially cool said heat transfer fluids by out-of-contact heat exchange with low-pressure returning heat transfer fluids;

(b) progressively further cooling said first and second high-pressure heat transfer fluids by out-of-contact heat exchange with the fluids circulated in said associated spaces of said refrigeration cycle;

(c) expanding the further-cooled first and second heat transfer fluids to finally cool them; and (d) recycling at least a portion of the resulting finally-cooled first and second low-pressure heat transfer fluids in out-of-contact heat exchange with said first and second high-pressure heat transfer fluids, respectively, introduced in step (a) of said heat transfer cycle.

14. Fluid refrigeration method according to claim 13 wherein said first heat transfer fluid has a boiling point below that of said second heat transfer fluid and the finally-cooled second heat transfer fluid obtained in step (c) of said heat transfer cycle is employed to effect a second further cooling of said first high-pressure heat transfer fluid prior to its expansion to achieve final cooling in step (c).

15. The fluid refrigeration method comprising a refrigeration cycle and a heat transfer cycle, said refrigeration cycle comprising the steps of (a) delivering high-pressure fluid from a high-pressure fluid source into communicating first and second spaces and compressing residual low-pressure fluid in said first space thereby to heat said residual fluid, while simultaneously discharging high-pressure fluid from communicating third and fourth enclosed spaces into a low-pressure region, thereby cooling said fluid in said fourth space;

(b) continuing delivery of said high-pressure fluid from said high pressure fluid source and transferring heated fluid from said first space to said second space, while simultaneously continuing discharging fluid from said fourth space thereby reducing its pressure to that of said low-pressure region and supplying fluid to said third space where it becomes residual low-pressure fluid;

(c) throughout delivery and discharge in steps (a) and (b) extracting heat from said high-pressure fluid thereby to cool it initially and transferring heat to the low-pressure fluid thereby to heat it initially;

(d) expanding said high-pressure fluid in said second space to cool it further by discharging it into a low-pressure region, while simultaneously supplying high-pressure fluid from a high-pressure fluid source to said third and fourth spaces and compressing said residual low-pressure fluid in said third space delivered thereto in step (b) thereby to heat said residual fluid;

(e) continuing transfer of fluid from said second space thereby reducing its pressure to that of said low-pressure region and supplying fluid to said first space to become said low-pressure residual fluid of step (a) while simultaneously continuing delivery of said high-pressure fluid from said high-pressure fluid source and transferring heated fluid from said third space to said fourth space; and (f) throughout discharge and delivery in steps (d) and (e) transferring heat to the low-pressure fluid to heat it initially while extracting heat from said high-pressure fluid to cool it initially, thereby establishing the conditions to begin step (a);

said first and third spaces forming a single warm zone and said second and fourth spaces forming a single cold zone;

said heat transfer cycle comprising the steps of (a) introducing into a heat transfer system high-pressure heat transfer fluid to initially cool it by out-of-contact heat exchange with low-pressure returning heat transfer fluid;

(b) progressively further cooling said high-pressure heat transfer fluid by out-of-contact heat exchange with the fluids circulated in said refrigeration cycle;

(c) expanding the further-cooled heat transfer fluid to finally cool it; and (d) recycling at least a portion of the resulting finally-cooled low-pressure heat transfer fluid in out-of-contact heat exchange with said high-pressure heat transfer fluid introduced into said heat transfer system in step (a) of said heat transfer cycle.

16. Refrigeration method comprising the following steps:

(a) delivering high-pressure fluid from a high-pressure fluid source into communicating first and second spaces and compressing residual low-pressure fluid in said first space thereby to heat said residual fluid, while simultaneously discharging high-pressure fluid from communicating third and fourth enclosed spaces into a low-pressure region, thereby cooling said fluid in said fourth space, said discharging from said fourth enclosed space being accomplished by way of a fifth enclosed space wherein said fluid delivers refrigeration to an external load;

(b) continuing delivery of said high-pressure fluid from said high pressure fluid source and transferring heated fluid from said first space to said second space, while simultaneously continuing discharging fluid from said fourth space thereby reducing its pressure to that of said low-pressure region and supplying fluid to said third space where it becomes residual low-pressure fluid;

(c) throughout delivery and discharge in steps (a) and (b) extracting heat from said high-pressure fluid thereby to cool it initially and transferring heat to the low-pressure fluid thereby to heat it initially;

(d) expanding said high-pressure fluid in said second space to cool it further by discharging it into a low-pressure region, thereby cooling said fluid in said second space, said discharging being accomplished by way of said fifth enclosed space wherein said fluid delivers refrigeration to said external load, while simultaneously supplying high-pressure fluid from a high-pressure fluid source to said third and fourth enclosed spaces and compressing said residual low-pressure fluid in said third space delivered thereto in step (b) thereby to heat said residual fluid;

(e) continuing transfer of fluid from said second space thereby reducing its pressure to that of said low-pressure region and supplying fluid to said first space to become said low-pressure residual fluid of step (a) while simultaneously continuing delivery of said high-pressure fluid from said high-pressure fluid source and transferring heated fluid from said third space to said fourth space; and (f) throughout discharge and delivery in steps (d) and (e) transferring heat to the low-pressure fluid to heat it initially while extracting heat from said high-pressure fluid to cool it initially, thereby establishing the conditions to begin step (a);

said first and third spaces forming a single warm zone, the total volume of which remains constant, the volume of each of said first and third spaces varying during the cycle; and said second and fourth spaces forming a single cold zone, the total volume of which remains constant, the volume of each said second and fourth spaces varying during the cycle from essentially zero to the total volume of said cold zone.

17. Method in accordance with claim 16 wherein said extracting and transferring heat in steps (c) and (f) comprise storing heat along paths joining said first and second spaces and said third and fourth spaces during delivery of high-pressure fluid and giving up heat along said paths during discharge of low-pressure fluid, and being further characterized by the step of surrounding at least said single cold zone and said fifth enclosed space with radiation shielding.

18. Method in accordance with claim 17 further characterized by the step of cooling said radiation shielding.

19. Refrigeration apparatus, comprising
(a) a first warm chamber of constant volume;
(b) a second cold chamber of constant volume;
(c) mechanically connected first and second piston means movable within said first and second chambers, respectively, and adapted to define within each of said chambers upper and lower subchambers of variable volumes;
(d) first passage means communicating between the upper subchamber of said first chamber and the lower subchamber of said second chamber;
(e) second passage means communicating between the lower subchamber of said first chamber and the upper subchamber of said second chamber;
(f) high-pressure fluid supply means in fluid communication with said upper and lower subchambers of said first chamber;
(g) low-pressure fluid exhaust means in fluid communication through said first and second passage means with said upper and lower subchambers of said second chamber; and
(h) heat exchange means associated with said first and second passage means and adapted to transfer heat between said high-pressure fluid and said low-pressure fluid as they are cycled through said apparatus.

20. Refrigeration apparatus in accordance with claim 19 wherein said heat exchange means comprises first and second heat storage means associated with said first and second passage means, respectively.

21. Refrigeration apparatus in accordance with claim 20 wherein said second heat storage means is said second passage means and is adapted to permit vertical movement therethrough of a connecting rod serving to mechanically connect said first and second piston means.

22. Refrigeration apparatus in accordance with claim 20 further characterized as including thermal heat station means located in said first and second passage means and associated with respective said first and second heat storage means, whereby fluctuations in the temperature of said fluids entering and leaving said heat storage means are minimized.

23. Refrigeration apparatus in accordance with claim 19 wherein said heat exchange means comprises a countercurrent, out-of-contact heat exchanger.

24. Refrigeration apparatus in accordance with claim 19 wherein said heat exchange means comprises a combination of countercurrent, out-of-contact heat exchanger and a regenerator.

25. Refrigeration apparatus in accordance with claim 19 further characterized by including auxiliary heat exchange means associated with said passage means and adapted to extract refrigeration by means of a heat transfer fluid.

26. Refrigeration apparatus in accordance with claim 19 having auxiliary heat exchange means comprising a mass of material having a high heat capacity at low temperatures and means associated with said mass for delivering refrigeration to an external load said auxiliary heat exchange means being located in said first and second passage means.

27. Refrigeration apparatus, comprising
(a) a first warm chamber of constant volume;
(b) a second auxiliary warm chamber of constant volume integral with said first warm chamber;
(c) a third cold chamber of constant volume;
(d) mechanically connected first, second and third piston means movable within said first, second and third chambers, respectively, and adapted to define within said first and third chambers upper and lower subchambers and to vary the volume of said second chambers, the surface area of said first piston being greater than the surface area of said third piston but less than that of the sum of the surface areas of said second and third pistons;
(e) first passage means communicating between the upper subchamber of said first chamber and the lower subchamber of said second chamber;
(f) second passage means communicating between the lower subchamber of said first chamber and the upper subchamber of said second chamber;
(g) high-pressure fluid supply means;
(h) low-pressure fluid exhaust means;
(i) valve-controlled conduit means connecting said second chamber and said high-pressure fluid supply means and said low-pressure exhaust means; and
(j) heat exchange means associated with said first and second passage means and adapted to transfer heat between said high-pressure fluid and said low-pressure fluid as they are cycled through said apparatus.

28. Refrigeration apparatus in accordance with claim 27 wherein said heat exchange means comprises first and second heat storage means associated with said first and second passage means, respectively.

29. Refrigeration apparatus in accordance with claim 27 wherein said second heat storage means is said second passage means and is adapted to permit vertical movement therethrough of a connecting rod serving to mechanically connect said first and second piston means.

30. Refrigeration apparatus, comprising
(a) a warm chamber of constant volume;
(b) a plurality of cold chambers each of which has a constant volume;
(c) piston means movable within each of said chambers, said piston means in said warm chamber being mechanically connected to said piston means in said cold chambers, said piston means defining by their movement within said chambers upper and lower subchambers of variable volume;

(d) first passage means communicating between the upper subchamber of said warm chamber and the lower subchambers of said cold chambers;

(e) second passage means communicating between the lower subchamber of said warm chamber and the upper subchambers of said cold chambers;

(f) high-pressure fluid supply means in fluid communication with said upper and lower subchambers of said warm chamber;

(g) low-pressure fluid exhaust means in fluid communication through said first and second passage means with said upper and lower subchambers of said cold chambers; and (h) a plurality of thermal storage means located in said first and second passage means and adapted to transfer heat between said high-pressure fluid and said low-pressure fluid as they are cycled through said apparatus.

31. Refrigeration apparatus in accordance with claim 30 having auxiliary heat exchange means associated with said first and second passage means and comprising a mass of material having a high heat capacity at low temperatures and means thermally bonded to said mass for delivering refrigeration to an external load.

32. Refrigeration apparatus in accordance with claim 30 wherein said second passage means are thermal storage means.

33. Refrigeration apparatus, comprising (a) a first warm chamber of constant volume;

(b) a second auxiliary warm chamber of constant volume integral with said first warm chamber;

(c) a plurality of cold chambers each of which has a constant volume;

(d) piston means movable within each of said chambers, said piston means in said first warm chamber being mechanically connected to said piston means in said second warm chamber and in said cold chambers, said piston means defining by their movement within said first warm chamber and each of said cold chambers upper and lower subchambers of variable volume;

(e) first passage means communicating between the upper subchamber of said warm chamber and the lower subchambers of said cold chambers;

(f) second passage means communicating between the lower subchamber of said warm chamber and the upper subchambers of said cold chambers;

(g) valve-controlled conduit means connecting said second warm chamber and said high-pressure fluid supply means and said low-pressure exhaust means;

(h) a plurality of thermal storage means located in said first and second passage means and adapted to transfer heat between said high-pressure fluid and said low-pressure fluids as they are cycled through said apparatus.

34. Refrigeration apparatus in accordance with claim 33 wherein said second passage means are thermal storage means.

35. Refrigeration apparatus, comprising a fluid refrigerating system in combination with a fluid heat transfer system, said fluid refrigerating system comprising (a) a warm chamber of constant volume;

(b) a plurality of cold chambers each of which has a constant volume;

(c) piston means movable within each of said chambers, said piston means in said warm chamber being mechanically connected to said piston means in said cold chambers, said piston means defining by their movement within said chambers upper and lower subchambers of variable volume;

(d) first passage means communicating between the upper subchamber of said warm chamber and the lower subchambers of said cold chambers;

(e) second passage means communicating between the lower subchamber of said warm chamber and the upper subchambers of said cold chambers;

(f) high-pressure fluid supply means;

(g) low-pressure fluid exhaust means; and (h) a plurality of thermal storage means located in said first and second passage means and adapted to transfer heat between said high-pressure fluid and said low-pressure fluids as they are cycled through said apparatus; said fluid heat transfer system comprising (a) first heat exchange means adapted to initially cool incoming high-pressure heat transfer fluid;

(b) second heat exchange means associated with said first and second passage means of said fluid refrigerating system adapted to further cool said high-pressure heat transfer fluid in said fluid heat transfer system subsequent to initial cooling in said first heat exchange means;

(c) expansion means adapted to finally cool said heat transfer fluid; and (d) return conduit means associated with said first heat exchange means adapted to return at least a portion of the low-pressure finally cooled heat transfer fluid through said first heat exchange means and to initially cool said high-pressure incoming heat fluid.

36. Apparatus in accordance with claim 35 including insulating means surrounding at least that portion of said apparatus maintained at temperatures below ambient temperature during operation.

37. Apparatus in accordance with claim 36 wherein said insulating means comprises an outer insulating structure and at least one radiation shield within said insulating structure thermally bonded to said second heat exchange means of said heat transfer system.

38. Refrigeration apparatus, comprising a fluid refrigerating system in combination with a fluid heat transfer system, said fluid refrigerating system comprising (a) a first warm chamber of constant volume;

(b) a second auxiliary warm chamber of constant volume integral with said first warm chamber;

(c) a plurality of cold chambers each of which has a constant volume;

(d) piston means movable within each of said chambers, said piston means in said first warm chamber being mechanically connected to said piston means in said second warm chamber and in said cold chambers, said piston means defining by their movement within said first warm chamber and each of said cold chambers upper and lower subchambers of variable volume;

(e) first passage means communicating between the upper subchamber of said warm chamber and the lower subchambers of said cold chambers;

(f) second passage means communicating between the lower subchamber of said warm chamber and the upper subchambers of said cold chambers;

(g) valve-controlled conduit means connecting said second warm chamber and said high-pressure fluid supply means and said low-pressure exhaust means;

(h) a plurality of thermal storage means located in said first and second passage means and adapted to transfer heat between said high-pressure fluid and said low-pressure fluids as they are cycled through said apparatus; said fluid heat transfer system comprising (a) first heat exchange means adapted to initially cool incoming high-pressure heat transfer fluid;

(b) second heat exchange means associated with said first and second passage means of said fluid refrigerating system adapted to further cool said high-pressure heat transfer fluid in said fluid heat transfer system subsequent to initial cooling in said first heat exchange means;

(c) expansion means adapted to finally cool said heat transfer fluid; and (d) return conduit means associated with said first heat exchange means adapted to return at least a portion of the low-pressure finally cooled heat transfer fluid through said first heat exchange means and to initially cool said high-pressure incoming heat transfer fluid.

39. Refrigeration apparatus, comprising a fluid refrigerating system in combination with a fluid heat transfer system, said fluid refrigerating system comprising
  (a) a warm chamber of constant volume;
  (b) a plurality of cold chambers each of which has a constant volume;
  (c) piston means movable within each of said chambers, said piston means in said warm chamber being mechanically connected to said piston means in said cold chambers, said piston means defining by their movement within said chambers upper and lower subchambers of variable volume;
  (d) first passage means communicating between the upper subchamber of said warm chamber and the lower subchambers of said cold chambers;
  (e) second passage means communicating between the lower subchamber of said warm chamber and the upper subchambers of said cold chambers;
  (f) high pressure fluid supply means in fluid communication with said upper and lower subchambers of said warm chamber;
  (g) low-pressure fluid exhaust means in fluid communication through said first and second passage means with said upper and lower subchambers of said cold chambers; and
  (h) a plurality of thermal storage means located in said first and second passage means and adapted to transfer heat between said high-pressure fluid and said low-pressure fluids as they are cycled through said apparatus; said fluid heat transfer system comprising
  (a) first and second high-pressure heat transfer fluid supply means;
  (b) first and second low-pressure heat transfer fluid reservoir means;
  (c) first and second heat exchange means associated with said first passage means of said refrigerating system;
  (d) third and fourth heat exchange means associated with said second passage means of said refrigerating system; said first and third heat exchange means being adapted to initially cool incoming first and second high-pressure heat transfer fluids; said second and fourth heat exchange means being associated with said thermal storage means in said fluid refrigeration system and adapted to further cool said high-pressure heat transfer fluids in out-of-contact heat transfer with the refrigerating fluids cycled in said refrigeration system;
  (e) first and second expansion means adapted to finally cool said first and second high-pressure heat transfer fluids, respectively, thereby to convert them to low-pressure cold fluids; and
  (f) first and second return conduit means associated with said first and third heat exchange means, respectively, adapted to return at least a portion of said low-pressure cold heat transfer fluids through said first and third heat exchange means in out-of-contact heat exchanger with said incoming high-pressure heat transfer fluids.

40. Refrigeration apparatus in accordance with claim 39 including a second auxiliary heat exchanger between said second expansion means and said second return conduit and a first auxiliary heat exchanger between said second auxiliary heat exchanger and said first expansion means, said auxiliary heat exchangers being adapted to further cool said first high-pressure heat transfer fluid prior to its expansion.

41. Refrigeration apparatus in accordance with claim 39 including insulating means surrounding at least that portion of said apparatus maintained at temperatures below ambient temperatures during operation.

42. Apparatus in accordance with claim 41 wherein said insulating means comprises an outer insulating structure and at least one radiation shield within said outer insulating structure thermally bonded to said second and fourth heat exchange means of said heat transfer system.

43. Refrigeration apparatus, comprising a fluid refrigerating system in combination with a fluid heat transfer system, said fluid refrigerating system comprising
  (a) a first warm chamber of constant volume;
  (b) a second cold chamber of constant volume;
  (c) mechanically connected first and second piston means movable within said first and second chambers, respectively, and adapted to define within each of said chambers upper and lower subchambers of variable volumes;
  (d) first passage means communicating between the upper subchamber of said first chamber and the lower subchamber of said second chamber;
  (e) second passage means communicating between the lower subchamber of said first chamber and the upper subchamber of said second chamber;
  (f) high-pressure fluid supply means in fluid communication with said upper and lower subchambers of said first chamber;
  (g) low-pressure fluid exhaust means in fluid communication through said first and second passage means with said upper and lower subchambers of said second chamber; and
  (h) thermal storage means associated with said first and second passage means and adapted to transfer heat between said high-pressure fluid and said low-pressure fluid as they are cycled through said apparatus; said heat transfer system comprising
  (a) first heat exchange means adapted to initially cool incoming high-pressure heat transfer fluid;
  (b) second heat exchange means associated with said first and second passage means of said fluid refrigerating system adapted to further cool said high-pressure heat transfer fluid in said fluid heat transfer system subsequent to initial cooling in said first heat exchange means;
  (c) expansion means adapted to finally cool said heat transfer fluid; and
  (d) return conduit means associated with said first heat exchange means adapted to return at least a portion of the low-pressure finally cooled heat transfer fluid through said first heat exchange means and to initially cool said high-pressure incoming heat transfer fluid.

44. Refrigeration apparatus, comprising a fluid refrigerating system in combination with a fluid heat transfer system, said fluid refrigerating system comprising
  (a) a first warm chamber of constant volume;
  (b) a second cold chamber of constant volume;
  (c) mechanically connected first and second piston means movable within said first and second chambers, respectively, and adapted to define within each of said chambers upper and lower subchambers of variable volumes;
  (d) first passage means communicating between the upper subchamber of said first chamber and the lower subchamber of said second chamber;
  (e) second passage means communicating between the lower subchamber of said first chamber and the upper subchamber of said second chamber;
  (f) high pressure fluid supply means in fluid communication with said upper and lower subchambers of said first chamber;
  (g) low-pressure fluid exhaust means in fluid communication through said first and second passage means with said upper and lower subchambers of said second chamber; and
  (h) thermal storage means associated with said first and second passage means and adapted to transfer heat between said high-pressure fluid and said low-pressure fluid as they are cycled through said apparatus; said heat transfer system comprising (a) first and second high-pressure heat transfer fluid supply means;

(b) first and second low-pressure heat transfer fluid reservoir means;

(c) first and second heat exchange means associated with said first passage means of said refrigerating system;

(d) third and fourth heat exchange means associated with said second passage means of said refrigerating system; said first and third heat exchange means being adapted to initially cool incoming first and second high-pressure heat transfer fluids; said second and fourth heat exchange means being associated with said thermal storage means in said fluid refrigeration system and adapted to further cool said high-pressure heat transfer fluids in out-of-contact heat transfer with the refrigerating fluids cycled in said refrigeration system;

(e) first and second expansion means adapted to finally cool said first and second high-pressure heat transfer fluids, respectively, thereby to convert them to low-pressure cold fluids; and (f) first and second return conduit means associated with said first and third heat exchange means, respectively, adapted to return at least a portion of said low-pressure cold heat transfer fluids through said first and third heat exchange means in out-of-contact heat exchanger with said incoming high-pressure heat transfer fluids.

45. Refrigeration apparatus in accordance with claim 44 including a second auxiliary heat exchanger between said second expansion means and said second return conduit and a first auxiliary heat exchanger between said second auxiliary heat exchanger and said first expansion means, said auxiliary heat exchangers being adapted to further cool said first high-pressure heat transfer fluid prior to its expansion.

46. Refrigeration apparatus in accordance with claim 44 including insulating means comprising an outer insulating structure and at least one radiation shield within said outer insulating structure thermally bonded to said second and fourth heat exchange means of said heat transfer system.

47. Refrigeration apparatus comprising (a) a first warm chamber of constant volume;

(b) a second cold chamber of constant volume;

(c) mechanically connected first and second piston means movable within said first and second chambers, respectively, and adapted to define within each of said chambers upper and lower subchambers of variable volumes;

(d) closed cycle heat exchange means adapted to furnish refrigeration to an external load;

(e) first passage means communicating between the upper subchamber of said first chamber and the lower subchamber of said second chamber and said heat exchange means;

(f) second passage means communicating between the lower subchamber of said first chamber and the upper subchamber of said second chamber and said heat exchange means;

(g) high-pressure fluid supply means in fluid communication with said upper and lower subchambers of said first chamber;

(h) low-pressure fluid exhaust means in fluid communication through said first and second passage means with said upper and lower subchambers of said second chamber; and (i) thermal storage means associated with said first and second passage means and adapted to transfer heat between said high-pressure fluid and said low-pressure fluid as they are cycled through said apparatus.

48. Refrigeration apparatus in accordance with claim 47 including at least one radiation shield surrounding at least that portion of said apparatus operating at temperatures below ambient temperatures.

49. Refrigeration apparatus in accordance with claim 48 further characterized by having pre-cooling coils associated with said radiation shield.

References Cited in the file of this patent
UNITED STATES PATENTS
2,966,035    Gifford _____ Dec. 27, 1960